US012319052B2

(12) United States Patent
Inoue

(10) Patent No.: US 12,319,052 B2
(45) Date of Patent: Jun. 3, 2025

(54) PRINTER

(71) Applicant: STAR MICRONICS CO., LTD., Shizuoka (JP)

(72) Inventor: Hiroki Inoue, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 219 days.

(21) Appl. No.: 18/067,931

(22) Filed: Dec. 19, 2022

(65) Prior Publication Data

US 2023/0202218 A1 Jun. 29, 2023

(30) Foreign Application Priority Data

Dec. 24, 2021 (JP) ................................ 2021-211603

(51) Int. Cl.
*B41J 15/02* (2006.01)
*B41J 15/04* (2006.01)

(52) U.S. Cl.
CPC .............. *B41J 15/02* (2013.01); *B41J 15/042* (2013.01); *B65H 2301/41346* (2013.01)

(58) Field of Classification Search
CPC ........ B41J 15/042; B41J 15/044; B41J 15/04; B41J 3/4075; B41J 29/02; B65H 19/12; B65H 19/30; B65H 2301/41346
See application file for complete search history.

(56) References Cited

U.S. PATENT DOCUMENTS

| | | | | | |
|---|---|---|---|---|---|
| 5,247,325 | A * | 9/1993 | Takahashi | G03B 17/30 | 242/348.4 |
| 6,302,604 | B1 * | 10/2001 | Bryant | B65H 23/02 | 242/597.5 |
| 6,364,552 | B1 * | 4/2002 | Nehowig | B41J 2/32 | 400/613 |
| 6,609,844 | B1 * | 8/2003 | Petteruti | B41J 3/36 | 400/613 |
| 8,845,219 | B2 * | 9/2014 | Tanaka | B41F 17/10 | 400/605 |
| 9,016,966 | B2 * | 4/2015 | Fujita | B41J 15/04 | 400/613.1 |
| 9,090,109 | B1 * | 7/2015 | Jo | B41J 3/4075 | |
| 9,475,665 | B2 * | 10/2016 | Tanaka | B65H 19/126 | |

(Continued)

FOREIGN PATENT DOCUMENTS

JP 2002-087652 A 3/2002

*Primary Examiner* — John Zimmermann
(74) *Attorney, Agent, or Firm* — Muncy, Geissler, Olds & Lowe, P.C.

(57) ABSTRACT

A printer provided with a storing space for a paper roll having a core hole in the center includes a paper roll holder having a protrusion adapted to fit into the core hole of the paper roll. The paper roll holder is switchable between a protruded state that the protrusion protrudes into the storing space and a retracted state that the protrusion retracts from the storing space. The printer further includes a stopper adapted to engage with the paper roll holder while the paper roll holder is in the protruded state to prevent the protrusion from turning to a predetermined direction. The paper roll holder moves when pushed by the paper roll that is being set into the storing space. Movement of the paper roll holder releases the engagement with the stopper to allow the protrusion to turn to the predetermined direction.

4 Claims, 27 Drawing Sheets

(56) References Cited

U.S. PATENT DOCUMENTS

| | | | | |
|---|---|---|---|---|
| 2002/0127041 | A1* | 9/2002 | Huggins | B41J 15/042 400/615.2 |
| 2011/0236115 | A1* | 9/2011 | Inoue | B41J 15/16 400/613 |
| 2011/0268488 | A1* | 11/2011 | Inoue | B65H 19/12 400/613 |
| 2013/0084121 | A1* | 4/2013 | Watanabe | B41J 3/4075 400/642 |
| 2013/0270386 | A1 | 10/2013 | Tanaka | |
| 2013/0314721 | A1* | 11/2013 | Colonel | B41J 11/0025 358/1.1 |

* cited by examiner

C-part expanded view

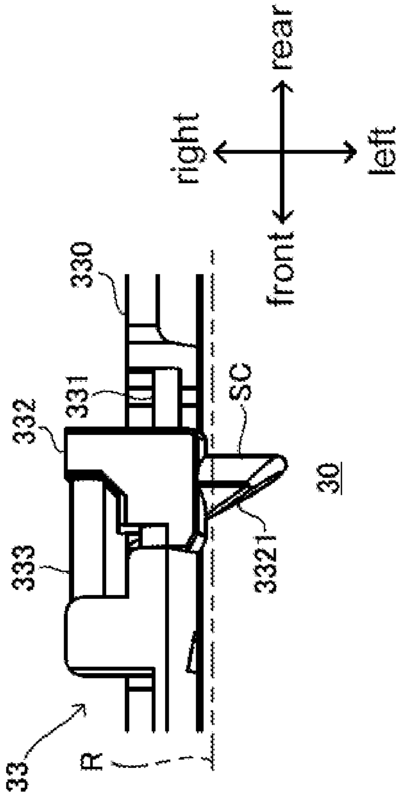
FIG. 20A1
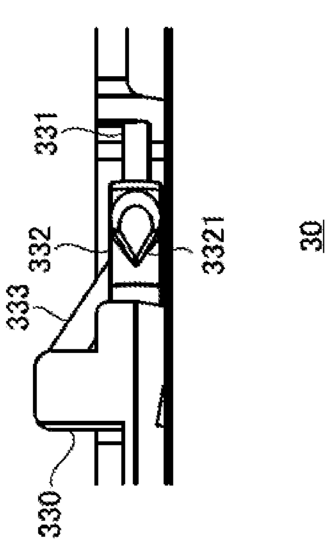
FIG. 20A2
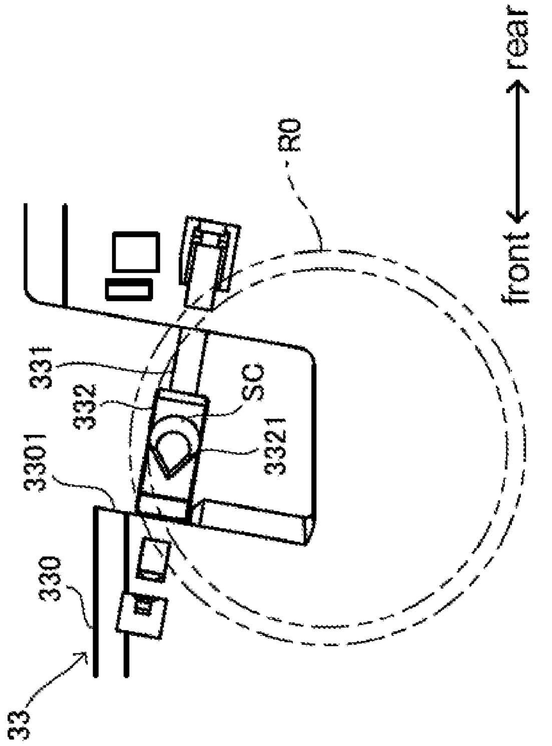
FIG. 20B1
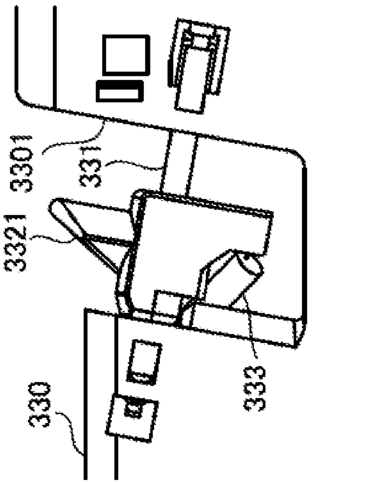
FIG. 20B2

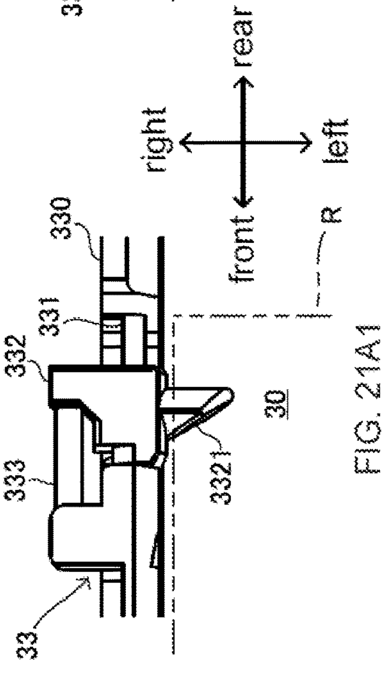
FIG. 21A1
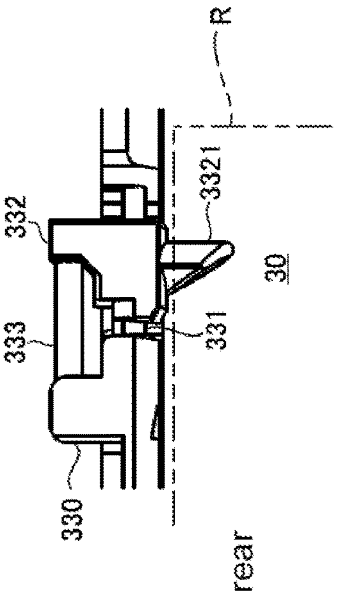
FIG. 21A2
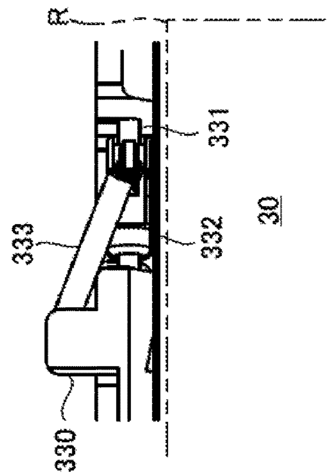
FIG. 21A3
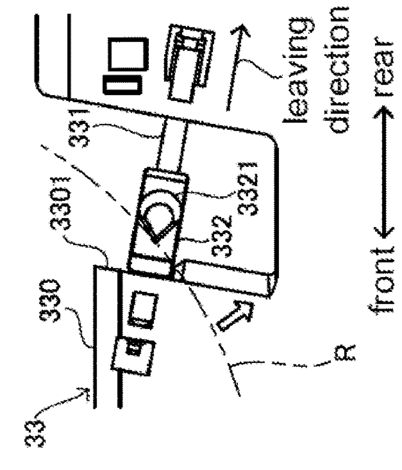
FIG. 21B1
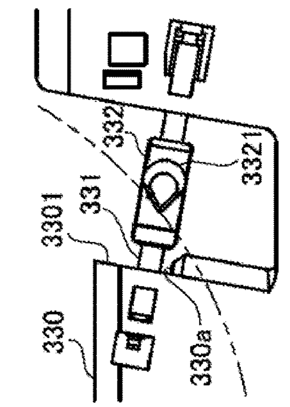
FIG. 21B2
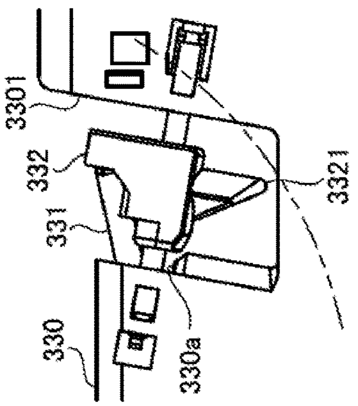
FIG. 21B3

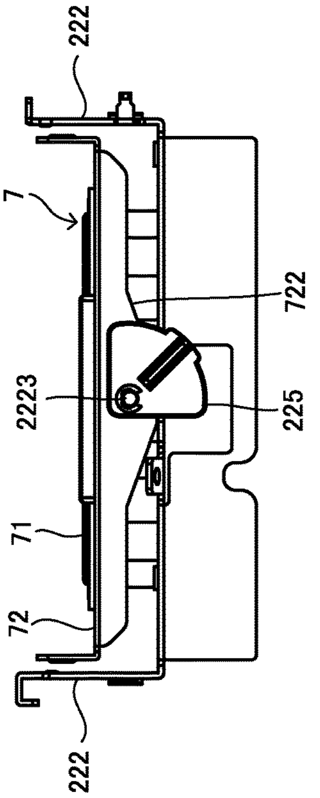
FIG. 23A2
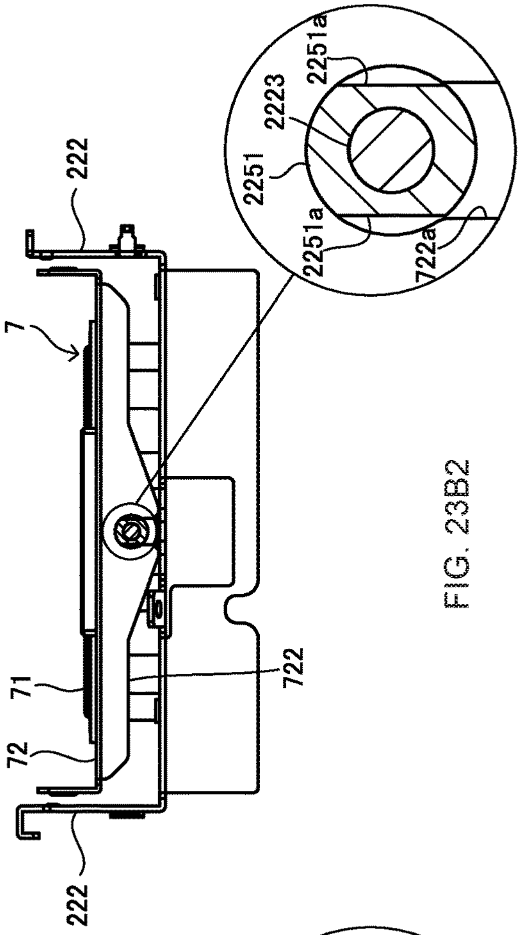
FIG. 23B2
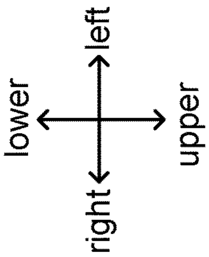
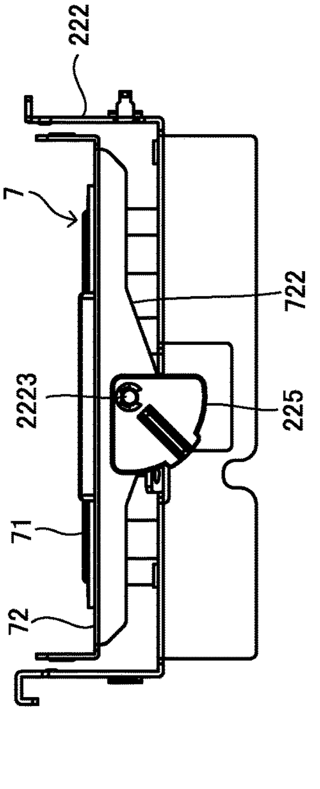
FIG. 23A1
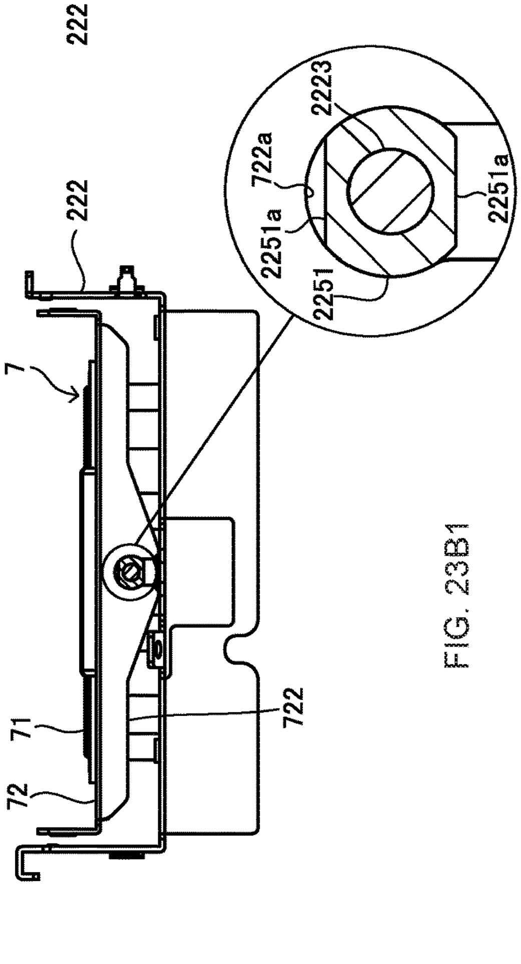
FIG. 23B1

PRINTER

CROSS-REFERENCE TO RELATED APPLICATIONS

This application claims priority of Japanese Patent Application No. 2021-211603 filed on Dec. 24, 2021. The contents of this application are incorporated herein by reference in their entirety.

BACKGROUND OF THE INVENTION

The present invention relates to a printer provided with a storing space for a paper roll.

A well-known printer provided with a storing space for a paper roll produces a printed image on paper drawn out the paper roll as disclosed in Japanese Unexamined Patent Publication No. 2002-87652. The printer is provided with a protrusion rotatably supporting the paper roll by fitting into the core hole thereof. The protrusion turns between a protruded state that the protrusion is protruded into the storing space and a retracted state that the protrusion is retracted from the storing space. The protrusion is normally urged to the protruded state by a tension spring. The protrusion turns to the retracted state against the force of the tension spring upon receipt of load toward the retracted state when the paper roll that is being installed by an operator hits the protrusion. The operator continues to push the paper roll until the core hole of the paper roll comes to a position facing the protrusion. The protrusion returns to the protruded state and fits into the core hole.

Especially, the protrusion in a label printer includes a structure to keep the paper roll off the walls constituting the storing space.

In the printer as disclosed in Japanese Unexamined Patent Publication No. 2002-87652, the protrusion turns to the retracted state when the paper roll hits the protrusion and then returns to the protruded state when the protrusion fits into the core hole of the paper roll, thereby facilitating the paper roll setting in the storing space.

SUMMARY

In the printer as disclosed in Japanese Unexamined Patent Publication No. 2002-87652, however, it is possible that the protrusion unintendedly turns to the retracted state upon receipt of unintended force, thus causing a slip of the paper roll out of the protrusion. Increasing force of the spring could inhibit the facilitation of the paper roll setting and further could cause a damage to the paper roll by the protrusion urged by increased spring force.

The present invention provides a printer capable of facilitating the paper roll setting and capable of suitably holding the paper roll.

The printer may be provided with a storing space for a paper roll having a core hole in the center. The printer may include a paper roll holder having a protrusion adapted to fit into the core hole of the paper roll. The paper roll holder may be switchable between a protruded state that the protrusion protrudes into the storing space and a retracted state that the protrusion retracts from the storing space. The paper roll holder may be adapted to hold the paper roll while the paper roll holder is in the protruded state. The printer may further include a stopper adapted to engage with the paper roll holder while the paper roll holder is in the protruded state to prevent the protrusion from turning to a predetermined direction. The paper roll holder may move when pushed by the paper roll that is being set into the storing space. Movement of the paper roll holder can release the engagement with the stopper to allow the protrusion to turn to the predetermined direction.

The stopper prevents a retraction of the paper roll holder even if some force is applied to the paper roll held by the paper roll holder. The stopper thereby prevents a slip of the paper roll out of the protrusion. Setting the paper roll in the storing space releases engagement of the paper roll holder with the stopper to thereby permit a retraction of the paper roll holder from the storing space, thus facilitating the paper roll setting in the storing space.

The predetermined direction may be a direction that the protrusion turns downwards. The moving direction of the paper roll holder pushed by the paper roll may be the direction toward the rotation center of the paper roll holder.

The paper roll holder may move in the front and rear directions of the printer. The paper roll holder may be positioned lower as the paper roll holder moves rearward. The paper roll holder may move rearward when pushed by the paper roll that is being set into the storing space.

The paper roll holder may move rearward when pushed by the paper roll, thus permitting an easy release of engagement of the paper roll holder with the stopper, and thereby facilitating the paper roll setting in the storing space.

The printer may be provided with a cover capable of closing the storing space from above and capable of opening the obliquely upward front side of the printer. The paper roll holder may be movable on a shaft obliquely extended with respect to the horizontal direction to permit the paper roll holder to be positioned lower as the paper roll holder moves rearward.

The printer may be provided with a resilient member that urges the paper roll holder to a position engageable with the stopper and that brings the paper roll holder into the protruded state.

When the paper roll is set in the storing space, urging force of the resilient member can bring the paper roll holder back to the protruded state to be engaged with the stopper.

The protrusion may have an upper front surface that is curved around the center line as the curve center, the center line extending rearward and upward toward the distal protruding end of the protrusion.

Putting the paper roll in the storing space brings the edge of the paper roll into engagement with the curved surface of the protrusion. Pushing the curved surface facilitates movement of the paper roll holder. Pushing the curved surface prevents a damage on the edge of the paper roll.

The present invention provides a printer capable of facilitating a paper roll installation and suitably holding the paper roll.

BRIEF DESCRIPTION OF THE DRAWINGS

FIG. 20A1 is a plan view of part of the side guide on the right side while the paper roll holder in the protruded state stays at the basic position.

FIG. 20A2 is a plan view of the protrusion retracted upward to permit removal of the paper roll from the storing space.

FIG. 20B1 is a left side view of the side guide shown in FIG. 20A1.

FIG. 20B2 is a left side view of the side guide shown in FIG. 20A2.

FIG. 21A1 is a plan view of part of the side guide on the right side while the paper roll holder in the protruded state stays at the basic position.

FIG. 21A2 is a plan view of part of the side guide on the right side while the paper roll is pushed a little into the storing space.

FIG. 21A3 is a plan view of part of the side guide on the right side while the paper roll is further pushed into the storing space.

FIG. 21B1 is a left side view of the side guide shown in FIG. 21A1.

FIG. 21B2 is a left side view of the side guide shown in FIG. 21A2.

FIG. 21B3 is a left side view of the side guide shown in FIG. 21A3.

FIG. 23A1 is a rear view of the head unit and the upper frame shown in FIG. 22A.

FIG. 23A2 shows the state that a head mounting lever has turned counterclockwise from the state in FIG. 23A1.

FIG. 23B1 is a sectional view of F-F line in FIG. 22A.

FIG. 23B2 is a sectional view of F-F line in FIG. 22A corresponding to the FIG. 23A2 state.

DETAILED DESCRIPTION

Figure 1:
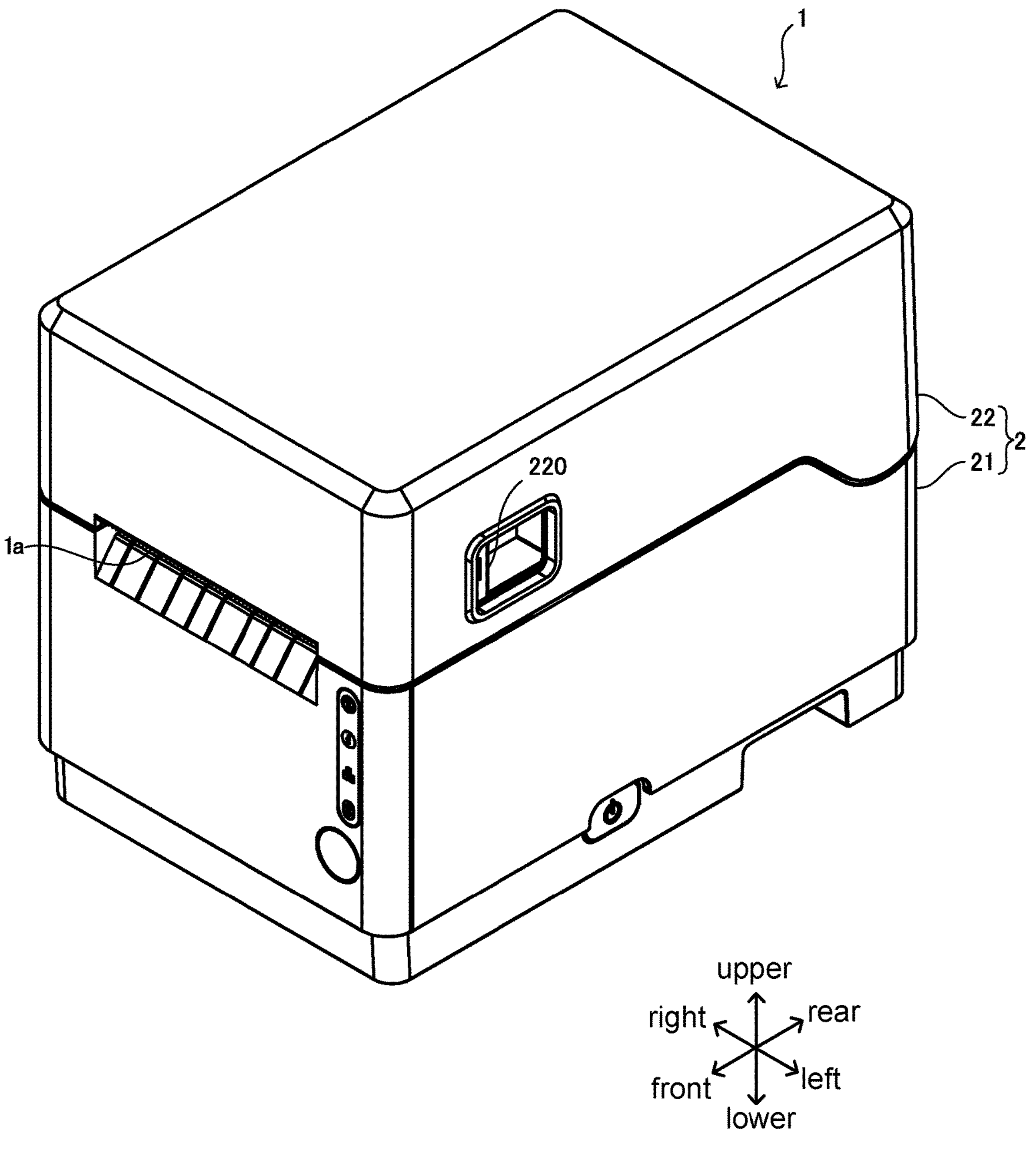
FIG. 1 is a perspective view of a printer of an embodiment of the invention as seen from obliquely upside.

Hereinafter, an embodiment of the present invention will be described referring to the drawings. A thermal printer provided with a storing space for a paper roll may produce a printed image on heat-sensitive paper drawn out the paper roll and then discharge the paper outside.

FIG. 1 is a perspective view of the printer of the embodiment of the invention as seen from obliquely upside. The obliquely left downside is the front side of the printer. The obliquely right upside is the rear side of the printer. The obliquely right downside is the left side of the printer. The obliquely left upside is the right side of the printer.

A printer 1 may include a casing 2. The casing 2 may include a body case 21 and a cover 22 both formed from flame-retardant resin. The body case 21 may cover a lower part of the printer 1. The cover 22 may be openably mounted on the case 21 through hinges provided at the rear end of the cover 22.

As shown in FIG. 1, the cover 22 may close the printer 1 from above. A paper discharge port 1*a* may be formed on the front side of the printer 1 between the cover 22 and the case 21. An open lever 220 may be provided on the left side of the cover 22. Pulling the lever 220 forward may release a not-shown lock to permit the cover 22 to turn with respect to the case 21. Lifting the front side of the cover 22 upward may turn the cover 22 around the rear end thereof to open the printer 1 obliquely front upward, thereby exposing the inside of the printer 1.

Figure 2:
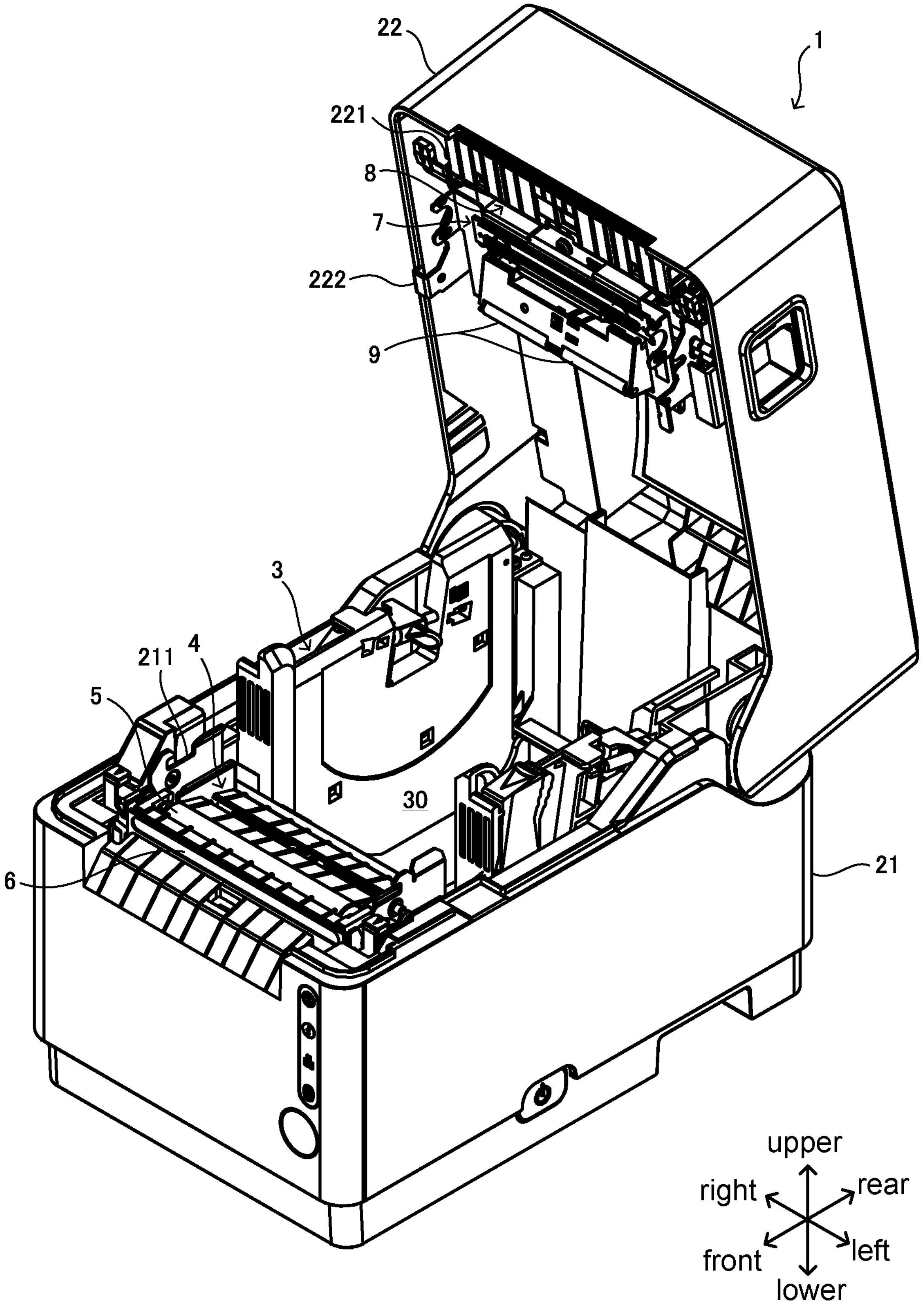
FIG. 2 is a perspective view of the printer whose cover is open.

FIG. 2 is a perspective view of the printer 1 whose cover 22 is open. The cover 22 may turn around the left and right hinges provided at the rear end of the cover 22. As shown in FIG. 2, the cover 22 may fully turn up to an 80-degree angle. The maximum angle may not be limited to 80 degrees.

Opening the cover 22 may expose an internal structure inside the casing 2 and a storing space 30 described below. The case 21 may contain a paper roll storing part 3, a conveyance guide 4, a platen unit 5, and a fixed blade 6. They may be all mounted on a sheet metal lower frame 211 fixed to the case 21. The paper roll storing part 3 may define the storing space 30. The cover 22 may cover the paper roll storing part 3, the storing space 30, the conveyance guide 4, the platen unit 5, and the fixed blade 6 from above. The storing space 30 may receive a paper roll R made of a rolled strip of paper (FIG. 12). The strip of paper may include labels and linerless labels without liner or backing paper. The printer 1 of the embodiment may be suitable for any type of labels.

The cover 22 may contain a head unit 7, a movable blade unit 8, and an upper guide 9. They may be all mounted on a sheet metal first upper frame 221 fixed to the cover 22 or on a second upper frame 222 fixed to the first upper frame 221.

Figure 3:
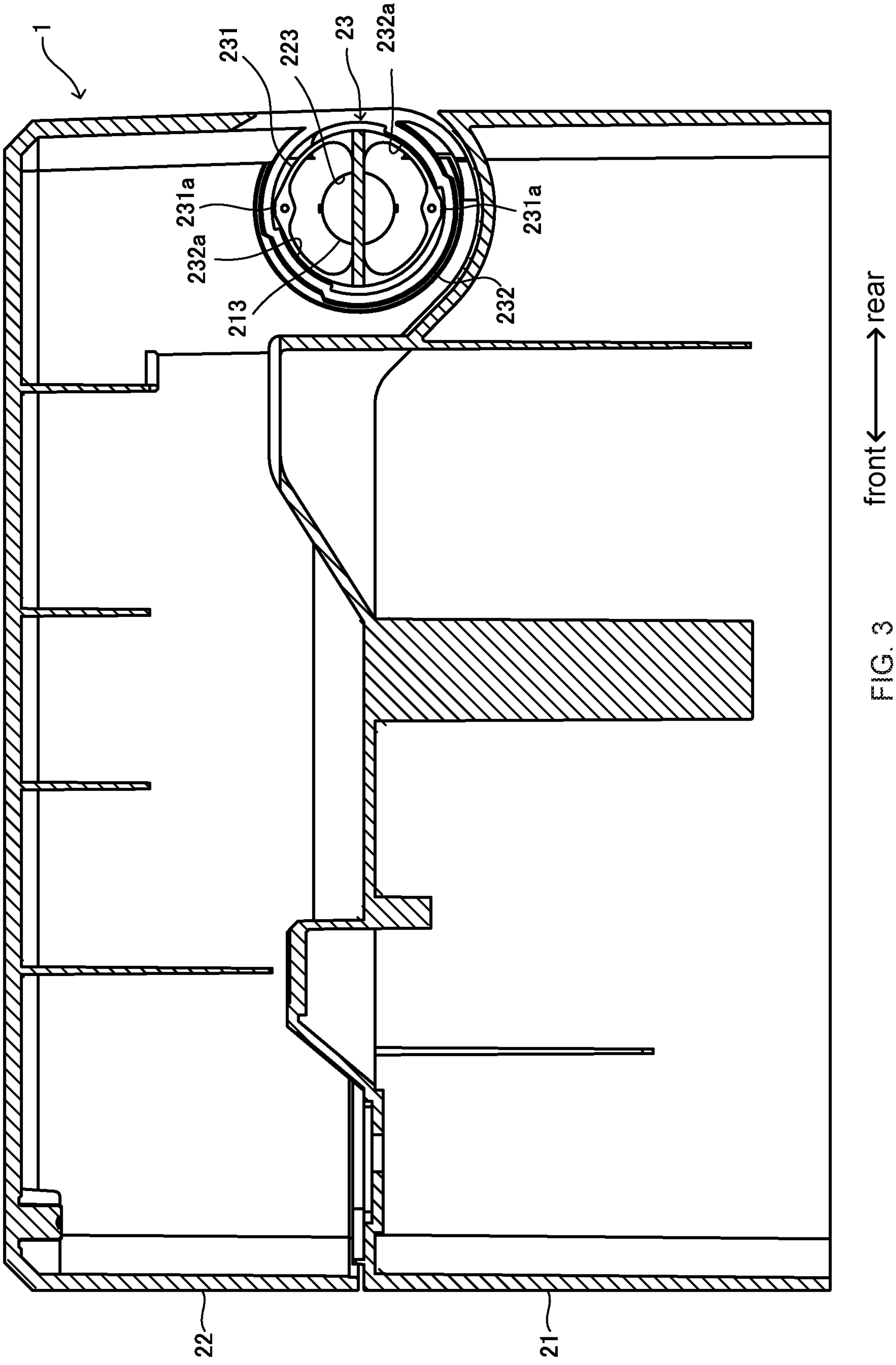
FIG. 3 is a sectional view of a hinge on the right side.

FIG. 3 is a sectional view of the hinge on the right side. FIG. 3 shows the case 21, the cover 22, and a brake mechanism 23 of the hinge on the right side. Other mechanisms are not shown.

The case 21 and the cover 22 may be coupled through the hinges on the right and left sides at the rear end thereof. As shown in FIG. 3, a left hinge shaft 213 fixed to the case 21 may engage with a left hinge cylinder 223 formed in the cover 22. The brake mechanism 23 may include a cylindrical spring 231 fixed to the case 21 and a brake cylinder 232 formed in the cover 22. The cylindrical spring 231 may be a plastic cylinder having slidable parts 231*a* projected outward respectively at the upper and lower ends. The brake cylinder 232 may cover the cylindrical spring 231 from outside. The brake cylinder 232 may have swelled parts 232*a* projected inward respectively at two opposite positions of the cylinder.

Figure 4A:
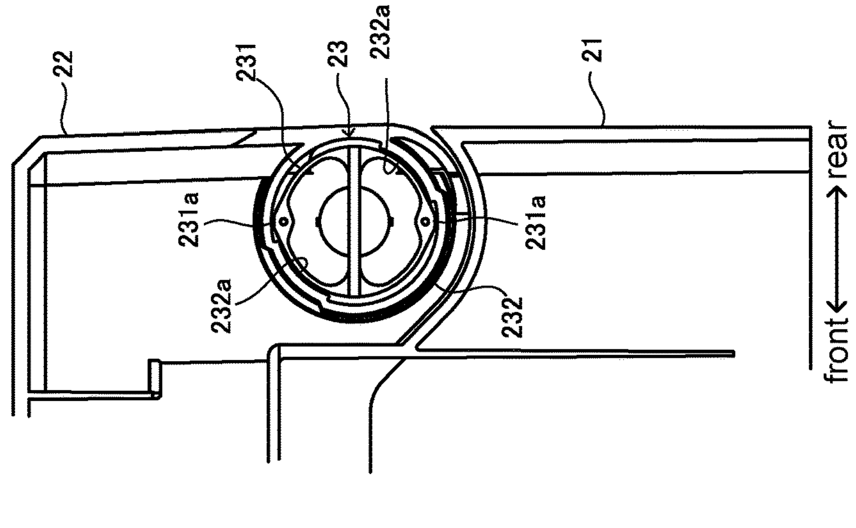
FIG. 4A is a sectional view of a brake mechanism of the hinge on the right side when the cover is closed.
Figure 4B:
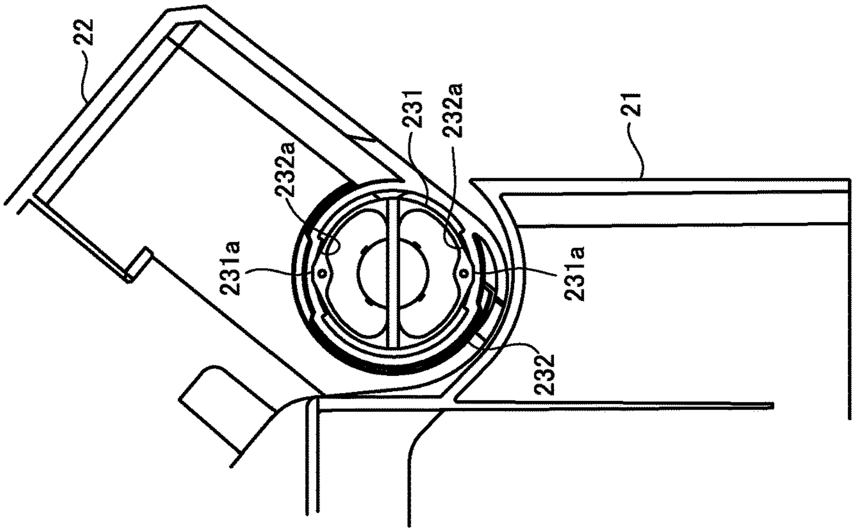
FIG. 4B is a sectional view of the brake mechanism of the hinge on the right side when the cover is open at a 40-degree angle.
Figure 4C:
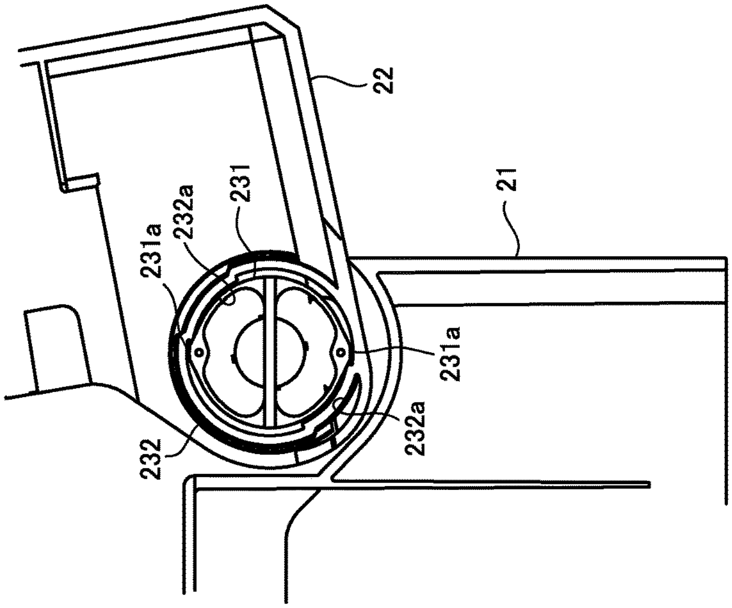
FIG. 4C is a sectional view of the brake mechanism of the hinge on the right side when the cover is open at an 80-degree angle.

FIG. 4A is a sectional view of the brake mechanism of the hinge on the right side when the cover 22 is closed. FIG. 4B is a sectional view of the brake mechanism of the hinge on the right side when the cover 22 is open at a 40-degree angle. FIG. 4C is a sectional view of the brake mechanism of the hinge on the right side when the cover 22 is open by an 80-degree angle. Cross sections are not hatched in the drawings.

When the cover 22 is closed as shown in FIG. 4A, the slidable parts 231*a* may face the inner circumferential surface of the brake cylinder 232 except that of the swelled parts 232*a*. There may be no contact between the slidable parts 231*a* and the inner circumferential surface of the swelled parts 232*a*. The cylindrical spring 231 may keep the original shape without deformation since no external force is applied. When the cover 22 is open as shown in FIG. 4C, too, there may be no contact between the slidable parts 231*a* and the inner circumferential surface of the brake cylinder 232. The cylindrical spring 231 may keep the original shape without deformation since no external force is applied. When the cover 22 is open at 40-degree angle as shown in FIG. 4B, however, the slidable parts 231*a* may be in contact with the inner circumferential surface of the swelled parts 232*a* respectively, causing deformation of the cylindrical spring 231 by vertical pressure applied thereto. Friction generated between the slidable parts 231*a* and the swelled parts 232*a* can restrict rotation of the cover 22. In this embodiment, when the cover 22 is open at a 7-degree angle or more and a 75-degree angle or less, the slidable parts 231*a* may be in contact with the swelled parts 232*a*, otherwise, the slidable parts 231*a* may be distant from the swelled parts 232*a*. When the cover 22 is fully open or closed, the cylindrical spring 231 may receive no force, thus being resistant to deterioration. Braking force may vary depending on the shape and the material of the slidable parts 231*a* and the brake cylinder 232. Contact angle range of the slidable parts 231*a* and the swelled parts 232*a* may be variable.

Figure 5:
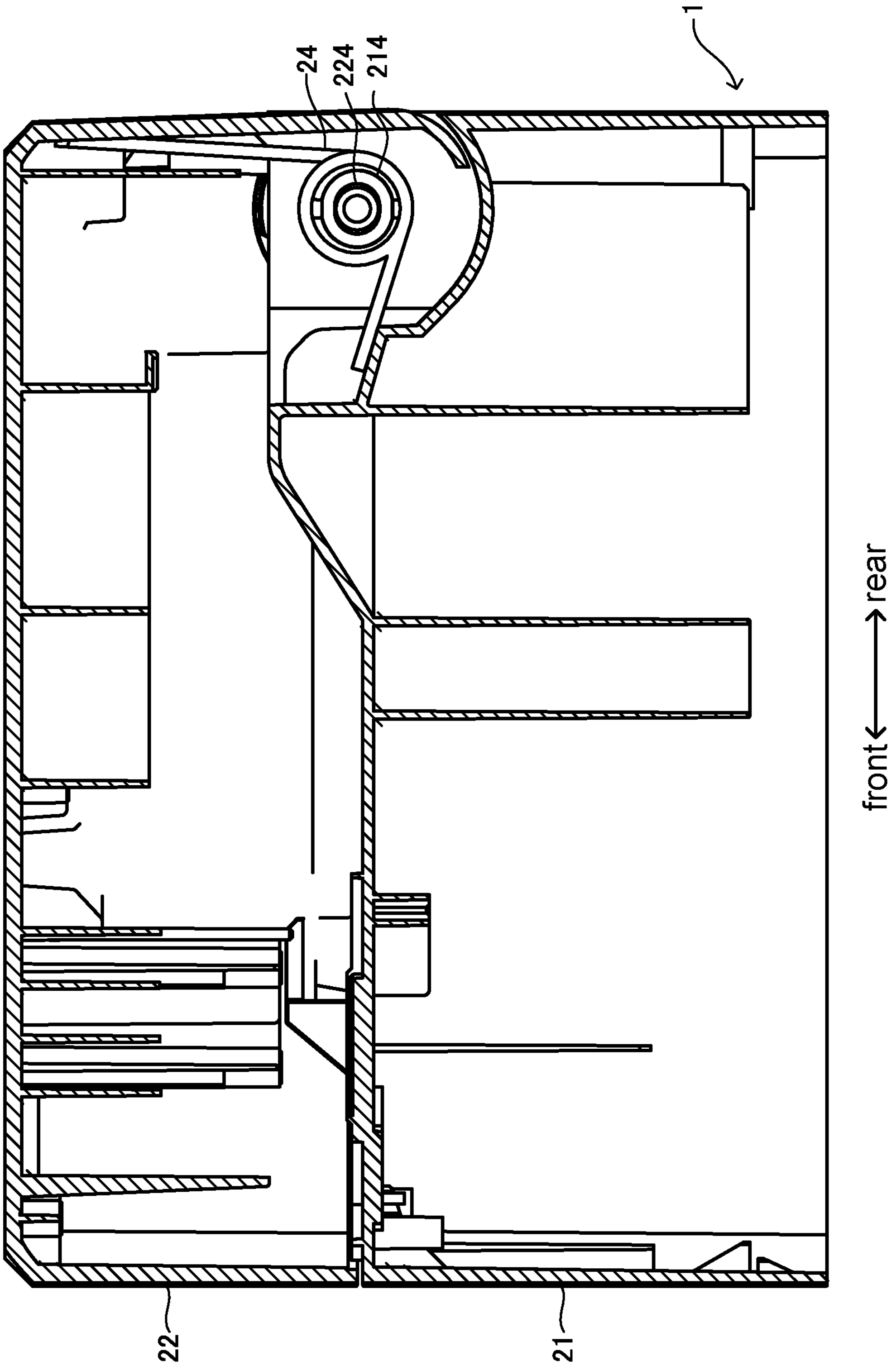
FIG. 5 is a sectional view of a hinge on the left side.
Figure 6:
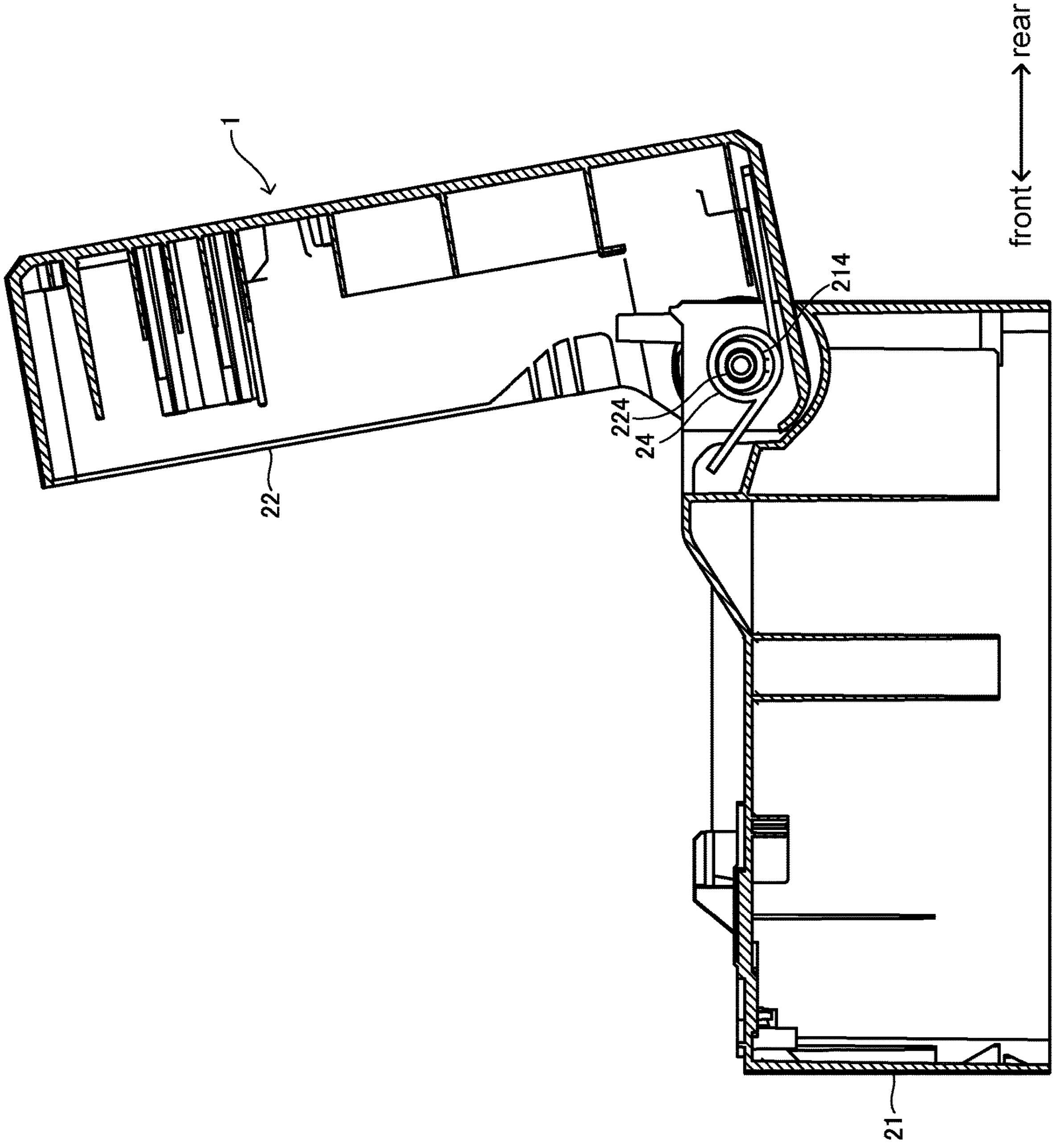
FIG. 6 is a sectional view of a torsion coil spring in the printer whose cover is open.

FIG. 5 is a sectional view of the hinge on the left side. FIG. 6 is a sectional view of a torsion coil spring in the printer whose cover is open. FIG. 5 and FIG. 6 show the body case 21, the cover 22, and the torsion coil spring 24 of the hinge on the left side without showing other mechanisms.

As shown in FIG. 5, a right hinge shaft 224 formed in the cover 22 may engage with a right hinge cylinder 214 formed in the case 21. The torsion coil spring 24 may urge the cover 22 toward an opening direction. The right hinge cylinder 214 may be put into a coil of the torsion coil spring 24. When the cover 22 is closed as shown in FIG. 5, a torsion angle of the torsion coil spring 24 urging the cover 22 toward the opening direction may be the maximum, specifically 62 degrees.

Urging force of the torsion coil spring 24 may become smaller as the open angle of the cover 22 becomes greater. When the cover 22 is open at the 62-degree angle as shown in FIG. 6, the torsion angle of the torsion coil spring 24 or urging force thereof may be zero. The torsion angle of the torsion coil spring 24 in the cover-closed state can be set as desired. The Torsion angle thereof in the cover-open state can be set zero or more.

In this embodiment, the torsion coil spring 24 may be mounted on one of the right and left hinges to facilitate opening the cover 22 containing a heavy unit such as the movable blade unit 8 (FIG. 2) and further to inhibit such heavy cover 22 unintendedly slamming. The brake mechanism 23 may be mounted on the other of the right and left hinges to inhibit such heavy cover 22 unintendedly slamming, too and further to quickly reduce vibration of the cover 22 in the opening and closing direction when the cover 22 hangs at an angle between the open state and the closed state. The brake mechanism 23 may further improve operability of the cover 22.

Figure 7:
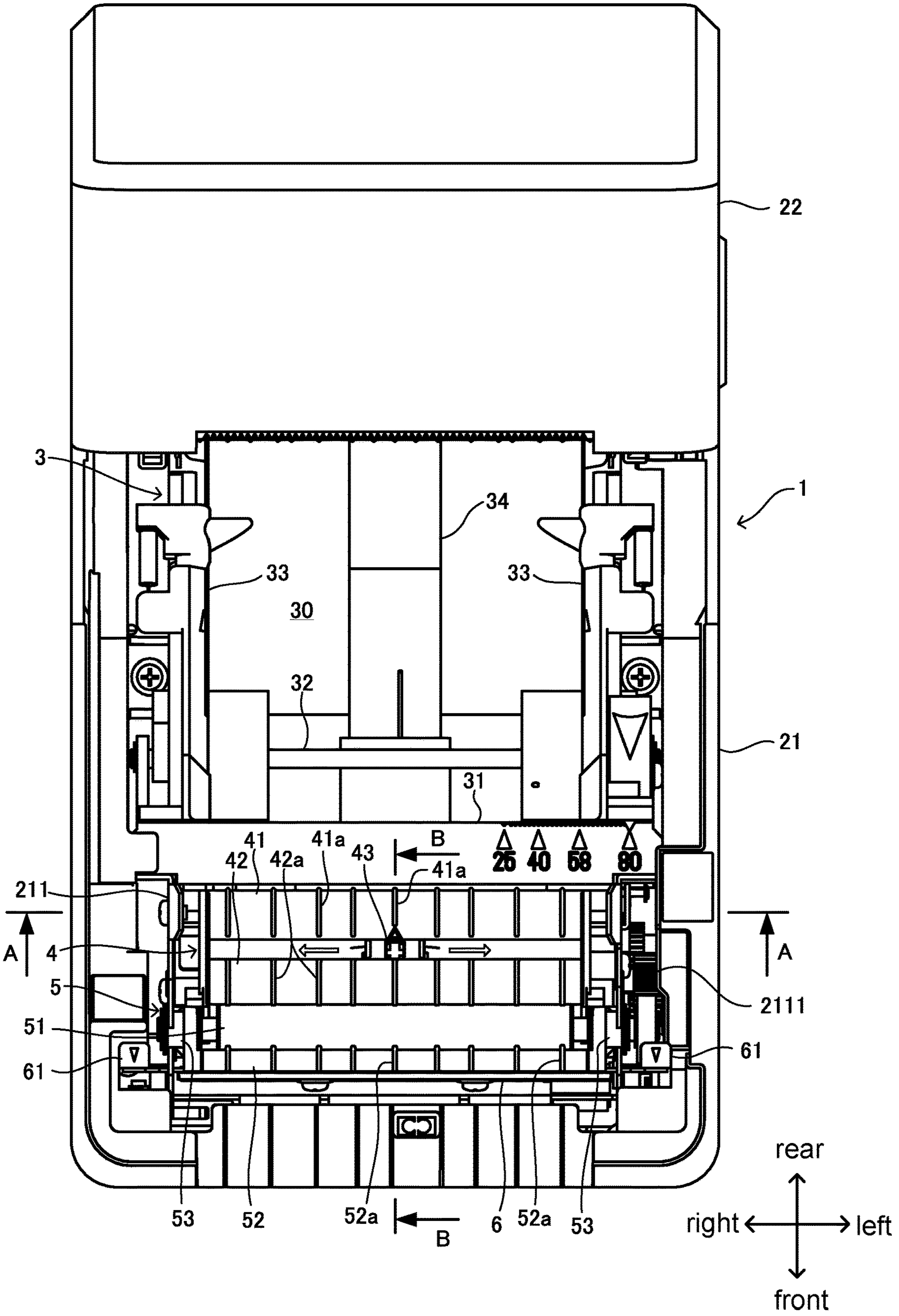
FIG. 7 is a plan view of the printer whose cover is open.

FIG. 7 is a plan view of the printer whose cover is open.

The paper roll storing part 3 may include a front guide 31, a slide shaft 32, a pair of widthwise side guides 33, and a drop detector 34. The pair of widthwise side guides 33 may move in the right and left directions of the printer. Details of the paper roll storing part 3 may be described below. The right and left directions of the printer 1 may be referred to as a width direction of the printer 1.

The conveyance guide 4 may include a first guide 41, a second guide 42, and a first paper sensor 43. The first guide 41 and the second guide 42 may be made of resin. The first guide 41 may have plural first ribs 41*a* protruded upward. The first rib 41*a* formed in the widthwise center may be shorter than the other first ribs 41*a* with respect to the front and back directions. The second guide 42 may have plural second ribs 42*a* like the first ribs 41*a*. The first paper sensor 43 may be arranged between the first guide 41 and the second guide 42. The first paper sensor 43 may be a reflective photo sensor having a light emitter and a light receiver on the same plane. The first paper sensor 43 may be movable in the width direction as shown by blank arrows. FIG. 7 shows that the first paper sensor 43 stays in the widthwise center.

Figure 8:
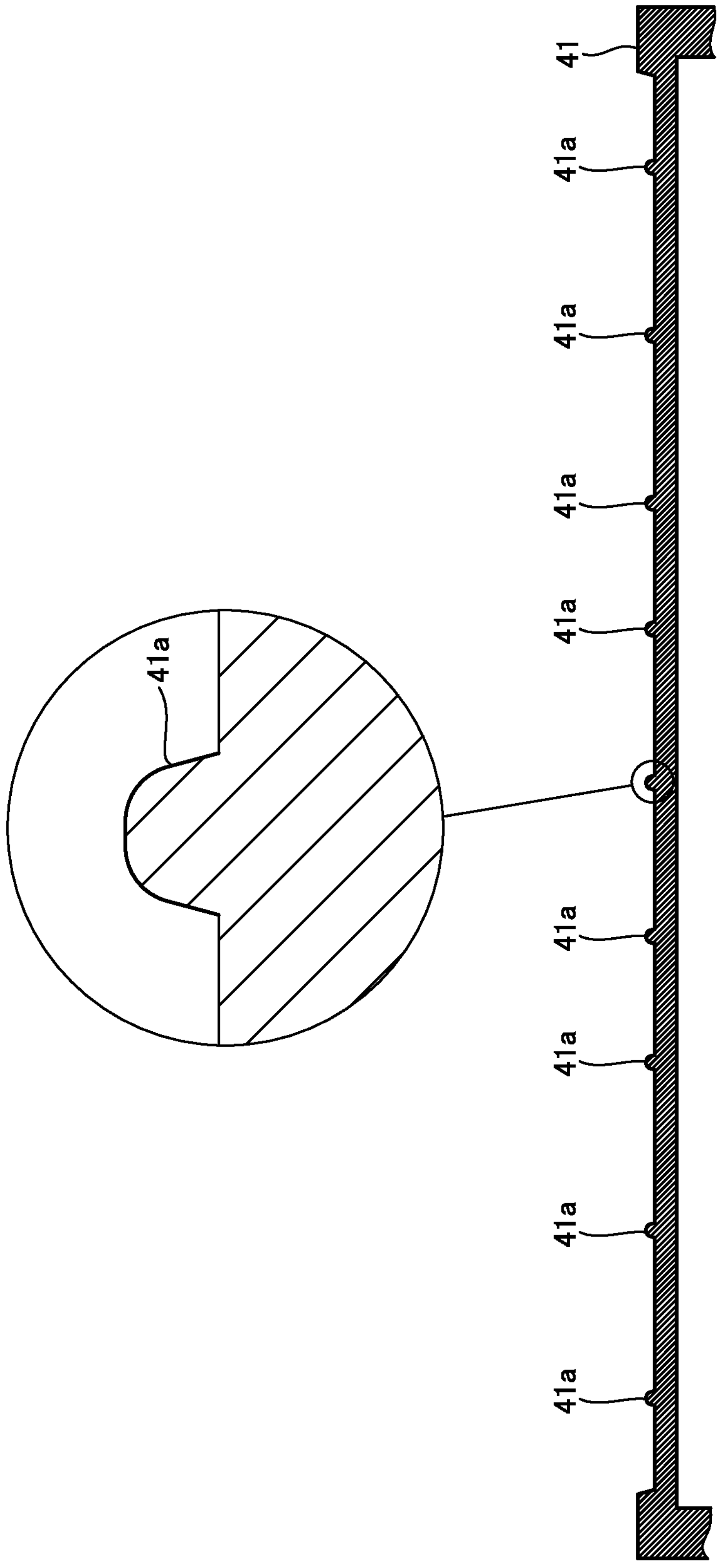
FIG. 8 is a sectional view of a first guide of A-A line in FIG. 7.

FIG. 8 is a sectional view of the first guide of A-A line in FIG. 7.

The plural first ribs 41*a* each may have the same sectional shape, which may be a mountain shape consisting of linear right and left slopes, a short top extended in the width direction, and curves connecting the slopes to the top as shown in FIG. 8. The sectional shape of the first rib 41*a* may have variations including a shape without the short top and a shape having circular right and left slopes. The sectional shape may be entirely circular. The sectional shape may be almost triangular with a sharp point. The plural first ribs 41*a* protruded upward can prevent adhesion of sticky paper to the conveyance guide 4 and further reduce conveyance load of paper. The second ribs 42*a* may have the same sectional shape as the first ribs 41*a*.

Figure 9:
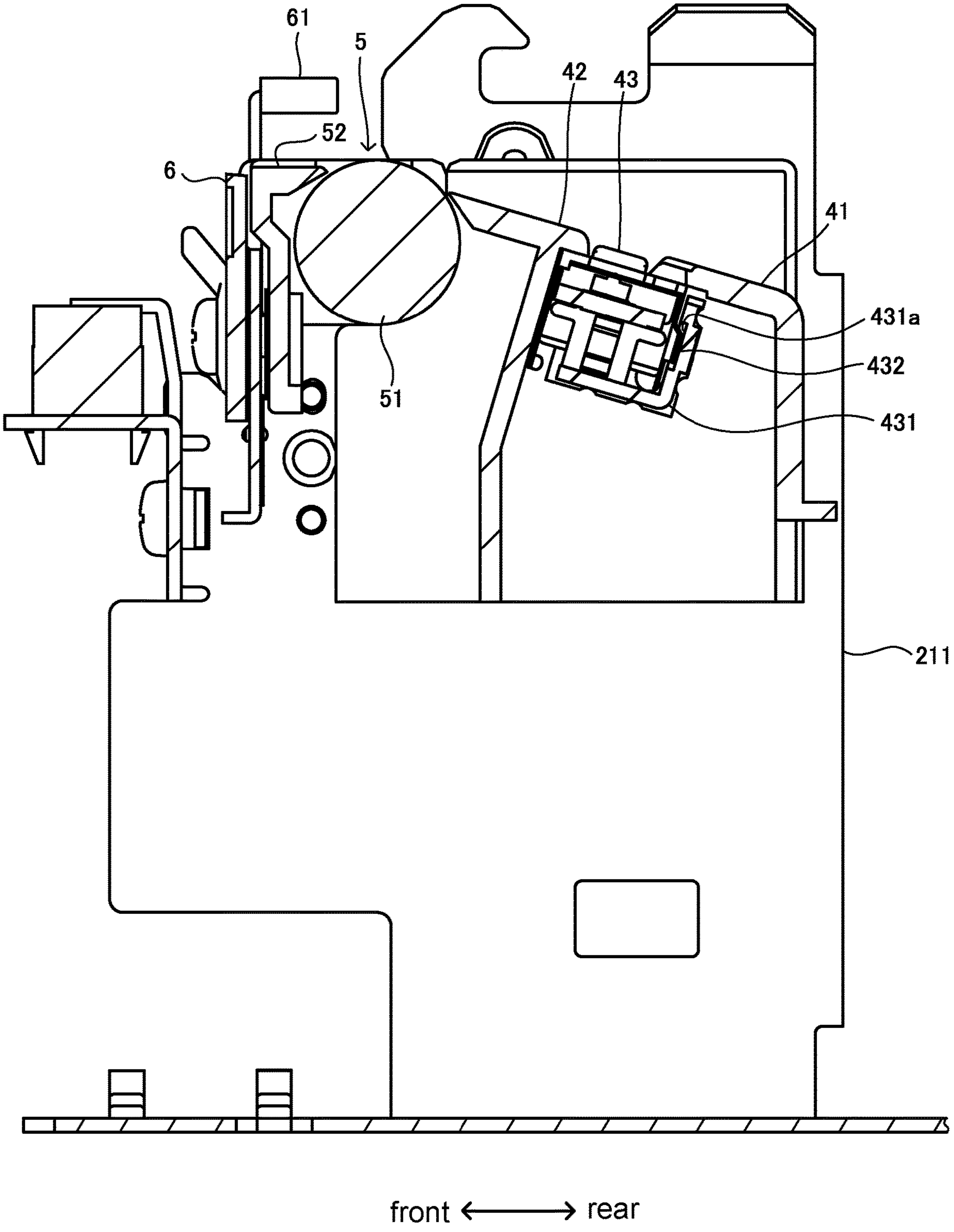
FIG. 9 is a sectional view of a conveyance guide, a fixed blade, and a platen unit of B-B line in FIG. 7.

FIG. 9 is a sectional view of the conveyance guide, the fixed blade, and the platen unit of B-B line in FIG. 7. FIG. 9 also shows the lower frame 211.

A slide guide 431 may be arranged between the first guide 41 and the second guide 42. The slide guide 431 having a cross section of an inverted L-shape may extend in the width direction. The slide guide 431 may be made of metal plate having plural slits 431*a* arranged side by side in the width direction. The first paper sensor 43 may be movable in the width direction along the slide guide 431. The first paper sensor 43 may have a sensor plate spring 432 made of metal. The sensor plate spring 432 may go in and out through the slits 431*a* as the first paper sensor 43 moves in the width direction, providing click-feeling movement of the first paper sensor 43. The first paper sensor 43 may stop at a desired position and stay there without widthwise rattling as the sensor plate spring 432 enters the slits 431*a*.

The first paper sensor 43 may serve as a black-mark sensor, a paper-end sensor, or a gap sensor. The first paper sensor 43 may optically detect a black mark put on the back surface of the paper roll R (FIG. 12). A not-shown controller may control the operation of the printer 1 according to the detection result. Widthwise position of the black mark may depend on the width and the type of the paper roll R. Since being movable in the width direction, the first paper sensor 43 can detect the black mark in any widthwise position by bringing a detection position thereof to the widthwise position of the black mark.

The first paper sensor 43 serving as the paper-end sensor may detect paper passing on the conveyance guide 4 at a position inside the width of the paper roll, normally in the widthwise center. The first paper sensor 43 serving as the gap sensor may detect a gap by the light emitting element on one side of a paper passage and the light receiving element on the opposite side of the paper passage, which is being described below. The first paper sensor 43 may be switchable among the black-mark sensor, the paper-end sensor, and the gap sensor by a not-shown DIP switch or a memory switch provided in the printer 1.

The platen unit 5 may be arranged on the downstream side of the second guide 42 with respect to the paper conveyance direction. As shown in FIG. 7, the platen unit 5 may include a platen roller 51, a platen frame 52 and two bearings 53. The platen roller 51 may be rotatably supported by the two bearings 53. The platen roller 51 may be made of silicon rubber and rotated by a not-shown motor. Such silicon rubber roller can prevent adhesion of linerless label paper whose adhesive bottom surface is exposed. The platen roller 51 may be made of any material other than silicon rubber. The surface of the roller 51, however, may be desirably made of non-adhesive material. The motor may be a stepping motor or another motor such as a DC motor. The motor may be secured to the lower frame 211. Driving force of the motor may be transmitted to the platen roller 51 through a gear train 2111 mounted on the lower frame 211. In the cover closed state, the platen roller 51 may be arranged opposite a print head 71 (FIG. 10) with paper being inserted therebetween. Rotation of the platen roller 51 may convey the paper to the downstream side in the paper conveyance direction.

The platen frame 52 may hold the platen roller 51 through the two bearings 53. The platen frame 52 may be made of resin. The platen frame 52 may have plural third ribs 52*a* on the upper surface thereof. The third ribs 52*a* may have the same sectional shape as the first guide 41 having the first ribs 41*a*. Oval through-holes may be respectively formed on the right and left sides of the platen frame 52. The bearing 53 may include a cylindrical body and a flange integrally formed with the body. The bearing 53 may be made of sintered metal. The sectional shape of the body may be circular inside and oval outside to match the shape of the through-hole of the frame 52. The end of the body of each of the bearings 53 may enter each of the through-holes formed on each of the sides of the platen frame 52.

The fixed blade 6 may be arranged on the downstream side of the platen unit 5 with respect to the paper conveyance direction. The fixed blade 6 may be made of plate metal having a cutting edge on the upper end thereof. The surface thereof may have fluorine-based coat. Such coated blade can prevent adhesion of linerless label paper whose adhesive bottom surface is exposed. The fixed blade 6 may have another non-adhesive surface treatment other than fluorine-based coat. The fixed blade 6 itself may be made of non-adhesive material. The fixed blade 6 may have knobs 61 on the widthwise ends thereof for use when removing the blade 6 from the lower frame 211.

Figure 10:
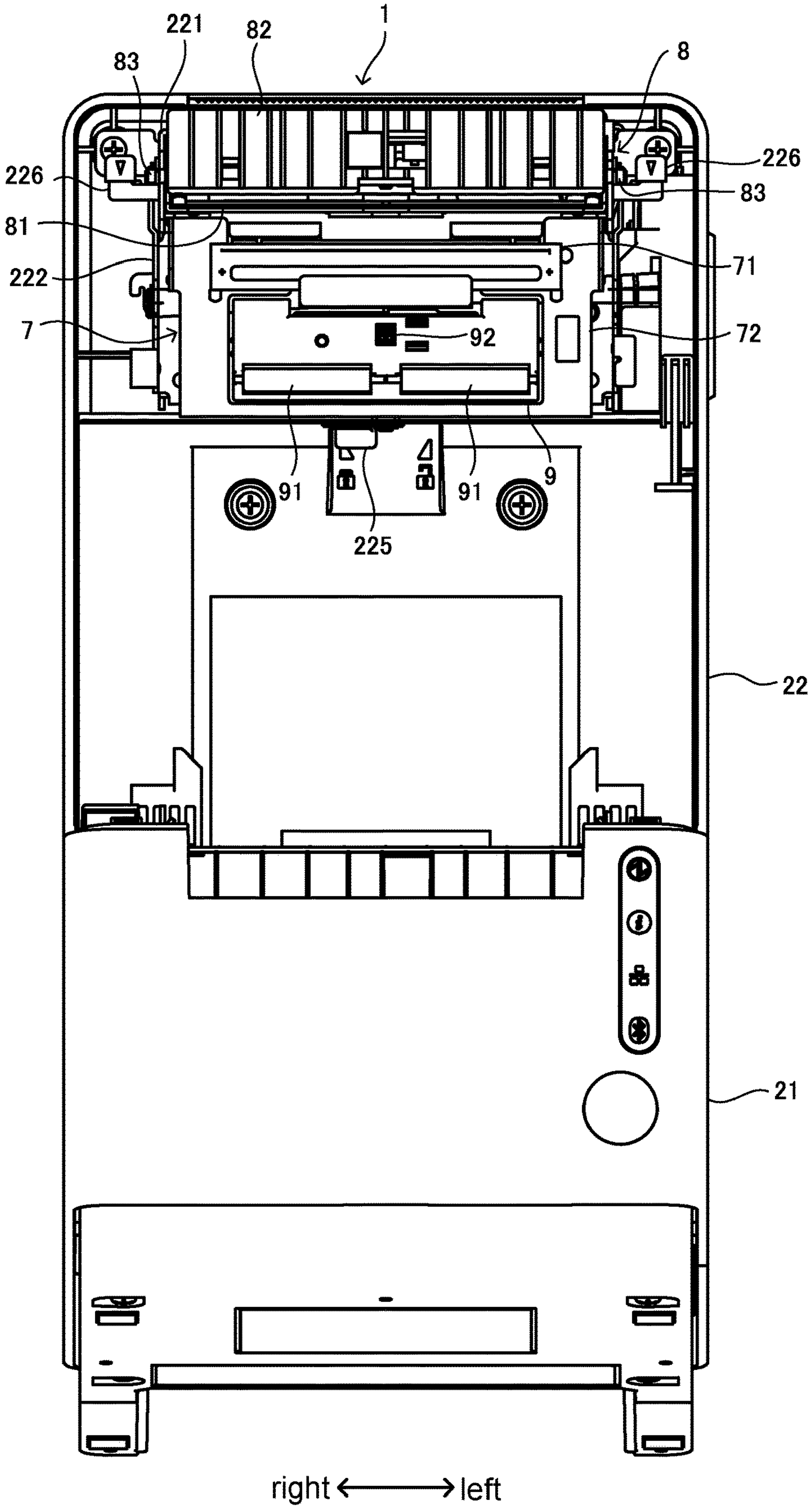
FIG. 10 shows the printer whose cover is open as seen from front downside.

FIG. 10 shows the printer whose cover is open as seen from front downside.

As shown in FIG. 10, the head unit 7 may include the print head 71 and a head frame 72. The print head 71 may be a thermal head having a plurality of heaters widthwise arranged in the right and left directions. Selectively heating the heaters can produce an image on paper passing between the print head 71 and the platen roller 51. The head frame 72 may be made of metal plate where the print head 71 is secured. The head frame 72 may detachably attach the head unit 7 to the second upper frame 222. The head unit 7 may be removed from the second upper frame 222 by operating a head mounting lever 225 turnably mounted on the second upper frame 222.

The movable blade unit 8 may include a movable blade 81, a movable blade frame 82 and two lock pins 83. The movable blade 81 may advance toward the fixed blade 6 (FIG. 7) and retract therefrom in the cover-closed state by a not-shown small DC motor provided inside the movable blade frame 82. The movable blade 81 advancing toward the fixed blade 6 may cut printed part of paper. The surface of the movable blade 81 may have fluorine-based coat. Such coated blade can prevent adhesion of linerless label paper whose adhesive bottom surface is exposed. The movable blade 81 may have another non-adhesive surface treatment other than fluorine-based coat. The movable blade 81 itself may be made of non-adhesive material.

The movable blade frame 82 may be of almost rectangular external shape. The movable blade frame 82 may contain the small DC motor described above and a driving mechanism to transmit motor torque to the movable blade 81 for advancing movement. The lock pins 83 may be secured to the movable blade frame 82. Each of the two lock pins 83 may protrude outward from each of the widthwise sides of the movable blade frame 82. The movable blade unit 8 may be slidable to be removed from the first upper frame 221 by operating two lock levers 226 mounted on the first upper frame 221. The lock levers 226 may normally engage with the lock pins 83 to prevent movement of the movable blade unit 8.

The upper guide 9 may hold two guide rollers 91 and a second paper sensor 92. The guide rollers 91 may be mounted on the upper guide 9 in a rotatable manner around its axis, facing the first guide 41 (FIG. 7) with an interval in the cover-closed state. The second paper sensor 92 may be secured to the upper guide 9 in the widthwise center. The second sensor 92 may be a reflective photo sensor like the first paper sensor 43 (FIG. 7).

Figure 11:
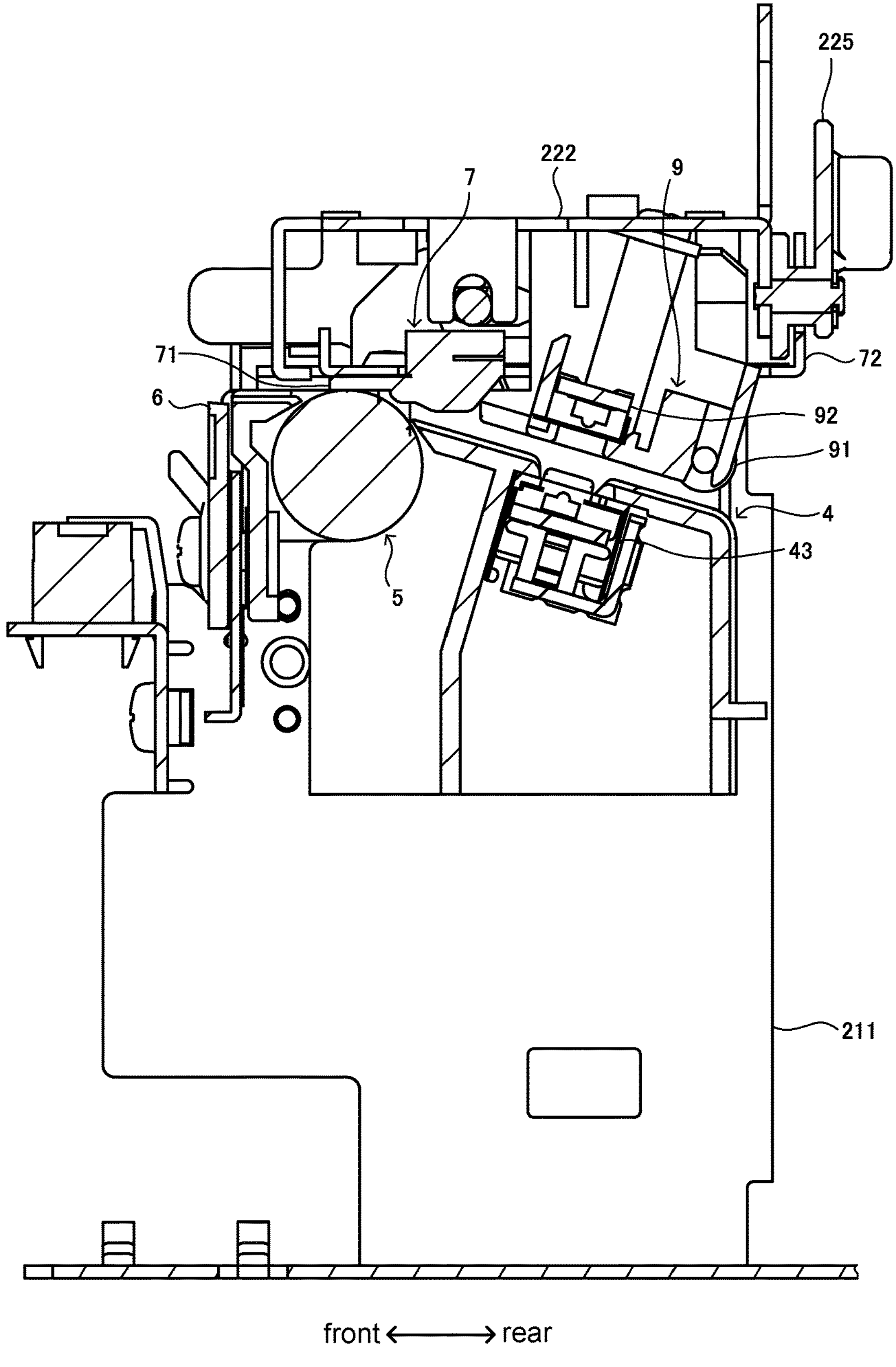
FIG. 11 is a sectional view of the conveyance guide, the fixed blade, the platen unit, a head unit, and an upper guide of the widthwise center.

FIG. 11 is a sectional view of the conveyance guide, the fixed blade, the platen unit, the head unit, and the upper guide of the widthwise center. The first paper sensor 43 is shown in the widthwise center like FIG. 9.

As shown in FIG. 11, the second paper sensor 92 may be brought to a position facing the first paper sensor 43 on the opposite side of the paper passage in the cover closed state (FIG. 1). The paper passage may be a gap formed between the platen unit 5 and the head unit 7 and between the conveyance guide 4 and the upper guide 9. The first paper sensor 43 and the second paper sensor 92 may cooperatively serve as a photo-interrupter when the gap sensor is selected by the DIP switch or the memory switch described above. By using one of the light emitting element and the light receiving element of the first paper sensor 43 and the other of those of the second paper sensor 92, the photo-interrupter may transmit light through paper by the light emitting element and detect light intensity by the light receiving element when paper comes between both elements to distinguish between label part (label on liner) and no-label part (liner only) of die cut label paper. In this embodiment, the light emitting element of the first paper sensor 43 and the light receiving element of the second paper sensor 92 serves as the photo-interrupter. The light receiving element of the first paper sensor 43 and the light emitting element of the second paper sensor 92 may also serve as the photo-interrupter. The second paper sensor 92 may be used as the paper-end sensor instead of the first paper sensor 43.

In this embodiment, one of the light emitting element and the light receiving element of the first paper sensor 43 may serve as an element for the gap sensor, which can reduce the cost of the printer 1 further than the case one of the elements is provided separately from the first paper sensor 43. The second paper sensor 92 may use the same sensor as the first paper sensor 43 to reduce the number of parts, thereby enhancing production efficiency and further reducing the cost of the printer 1.

Figure 12A:
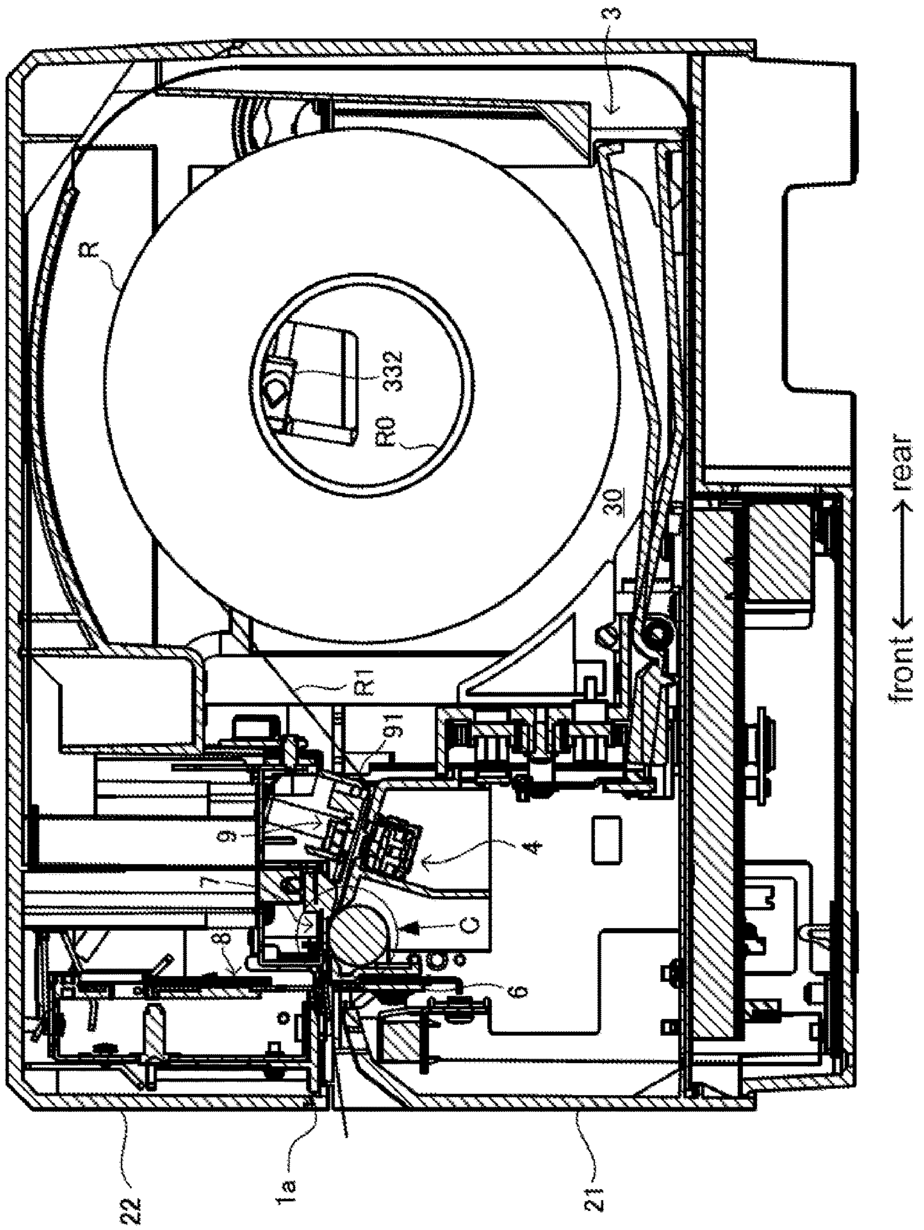
FIG. 12A is a sectional view of the printer of the widthwise center.
Figure 12B:
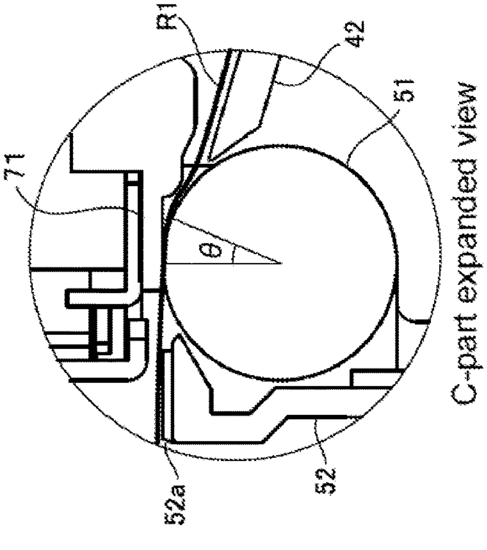
FIG. 12B is an expanded view of C-part in FIG. 12A

FIG. 12A is a sectional view of the printer of the widthwise center. FIG. 12A shows the paper roll R and paper R1 drawn out of the paper roll R. The diameter of the paper roll R before use may depend on the type of paper. The diameter thereof may be reduced as paper is used. FIG. 12B is an expanded view of C-part in FIG. 12A without hatching for cross sections.

As shown in FIG. 12A, the paper roll R may be a roll of continuous paper R wound around a paper core R0 having a core hole in the center. The paper roll R set in the storing space 30 may be held by a paper roll holder 332 with a distance from the bottom surface of the paper roll storing part 3. As the paper R is drawn out of the roll, the paper roll may rotate while the inner circumferential surface of the core hole of the paper core R0 being in contact with an upper surface of the paper roll holder 332. The paper R may be conveyed by the guide roller 91 into between the conveyance guide 4 and the upper guide 9 and into between the platen roller 51 and the print head 71 to be finally discharged forward through the paper discharge port 1*a*. The paper passage formed by the conveyance guide 4 and the upper guide 9 may somewhat incline with respect to the horizontal direction at an almost 15-degree angle, which is smaller than a conventional thermal printer. As shown in FIG. 12B, the paper R passing through the print head 71 may be almost horizontally conveyed near the platen roller 51 by the third ribs 52*a* formed on the platen frame 52. Winding angle θ (contact angle) of paper R1 on the platen roller 51 may be around 15 degrees. The winding angle θ may be desirably 10 degrees or more and 20 degrees or less. If less than 10 degrees, a downward protrusion of the print head 71 could deform the paper R1. If more than 20 degrees, a linerless label whose adhesive bottom surface exposed could stick to the platen roller 51, probably causing a paper jam.

In this embodiment, the winding angle θ may be set smaller. The fixed blade 6, the movable blade 81, and the platen roller 51 may use non-adhesive material. The first guide 41 (FIG. 7), the second guide 42, and the platen frame 52 may have plural ribs on the upper surface. The embodiment may thereby provide a stable paper conveyance regardless of type of paper. The embodiment may be highly effective for a linerless label whose adhesive bottom surface is exposed. The embodiment may be also effective for normal paper without adhesive due to reduced conveyance resistance.

Figure 13:
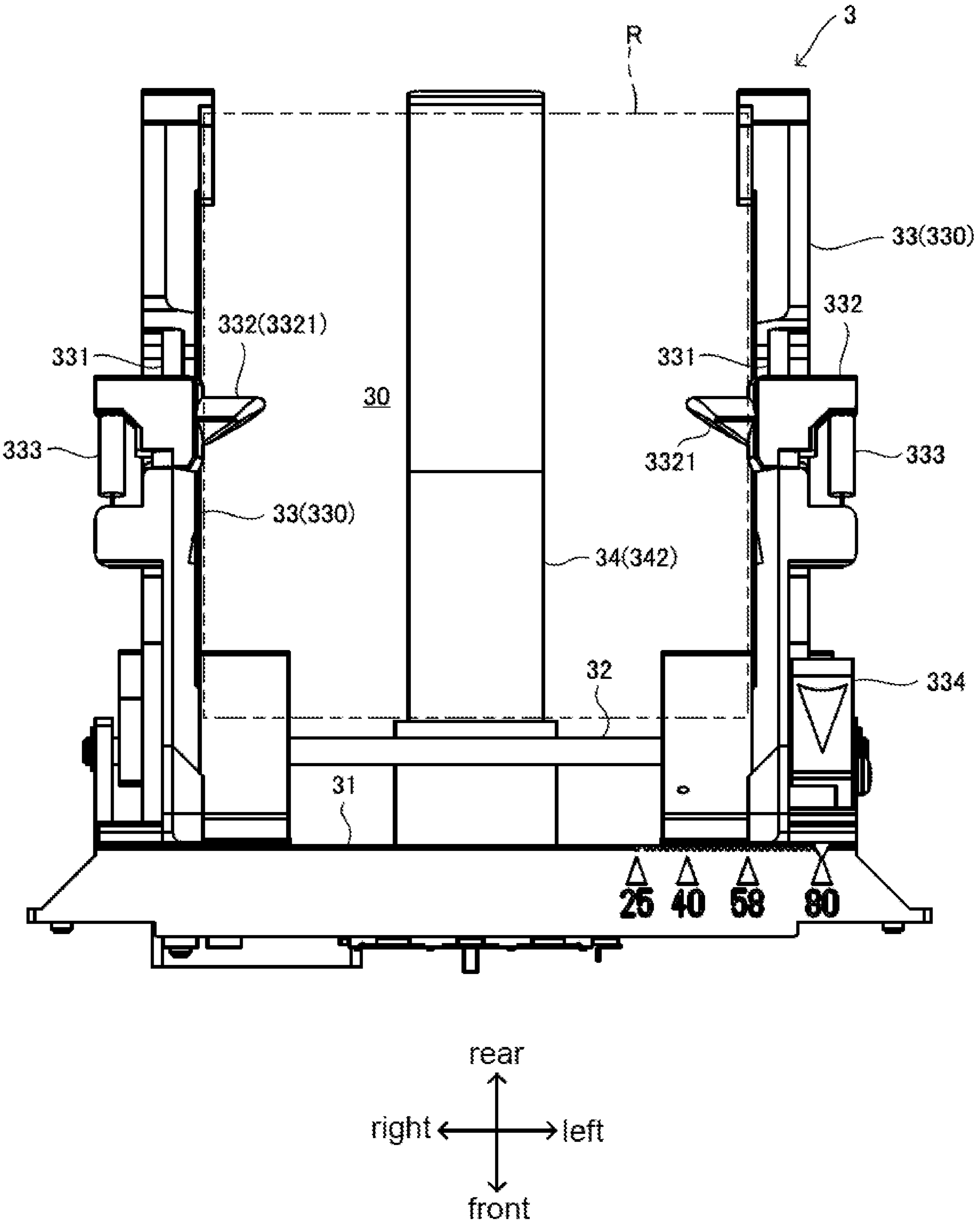
FIG. 13 is a plan view of a front guide, a pair of side guides, and a drop detector provided in a paper roll storing part of the printer.

FIG. 13 is a plan view of the front guide, the pair of widthwise side guides, and the drop detector provided in the paper roll storing part of the printer. The paper roll R held by the paper roll holder 332 is shown by two dot chain lines.

As described above, the paper roll storing part 3 may include the front guide 31, the slide shaft 32, the pair of widthwise side guides 33, and the drop detector 34. The front guide 31 made of resin may be secured to the lower frame 211 (FIG. 2) to serve as a front wall of the paper roll storing part 3. The upper surface of the front guide 31 may have a scale for use to examine the distance between the widthwise side guides 33. The front surface of the front guide 31 may have a guide pinion 311 (FIG. 14A) and a potentiometer 312 (FIG. 14A) described below. The front surface of the front guide 31 may also have a not-shown rail on which a guide rack 335 (FIG. 14A) described below may move in the width direction. The slide shaft 32 may extend in the width direction. The widthwise ends of the slide shaft 32 may be held by the front guide 31.

Figure 14A:
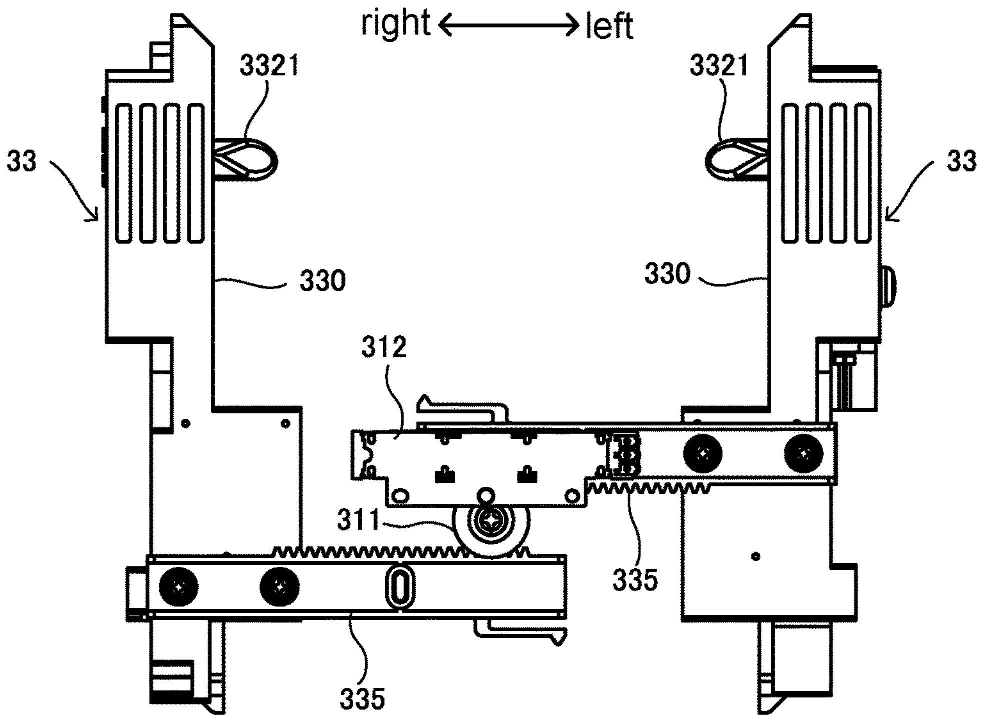
FIG. 14A is a front view of a guide pinion, a guide rack, a potentiometer, and the side guides provided in the paper roll storing part.

The pair of widthwise side guides 33 may move in the width direction on the slide shaft 32. A space between the pair of side guides 33 may serve as the storing space 30 for the paper roll R. The side guide 33 on the left side may be provided with a guide fixing lever 334 for permitting or inhibiting widthwise movement of the side guide 33. The side guide 33 on the left side may have a sign for indicating the distance between the pair of side guides 33. Other than above, the pair of side guides 33 may be almost planar symmetry with respect to a plane perpendicular to the width direction. A description of one of the side guides 33 may apply to the other as the case may be. The widthwise side guide 33 may include a side guide body 330, a holder guide shaft 331, the paper roll holder 332, a holder tension spring 333, and the guide rack 335 (FIG. 14A). The holder tension spring 333 may be an example of the resilient member. The side guide body 330 may be made of resin constituting a side wall of the paper roll storing part 3. The side guide body 330 may hold the holder guide shaft 331, the paper roll holder 332, the holder tension spring 333, and the guide rack 335. The paper roll holder 332 may have a protrusion 3321. The paper roll holder 332 may be an integrally molded element of resin such as POM (polyacetal resin) and PC (polycarbonate resin). The protrusion 3321 may be formed as part of the paper roll holder 332. The protrusion 3321 as protruding toward the storing space 30 may enter the core hole of the paper core R0 (FIG. 12) of the paper roll R to hold the paper roll R. The protrusion 3321 may be desirably made of harder material of higher wear resistance against friction with the paper roll R as being set in the storing space 30. The protrusion 3321 may be surface-treated to reduce friction with the paper roll R as being set in the storing space 30, facilitating smooth installation of the paper roll in the printer 1. The protrusion 3321 may be surface-treated to increase friction with the paper roll R, improving holding power to prevent a drop of the paper roll.

Figure 14B:
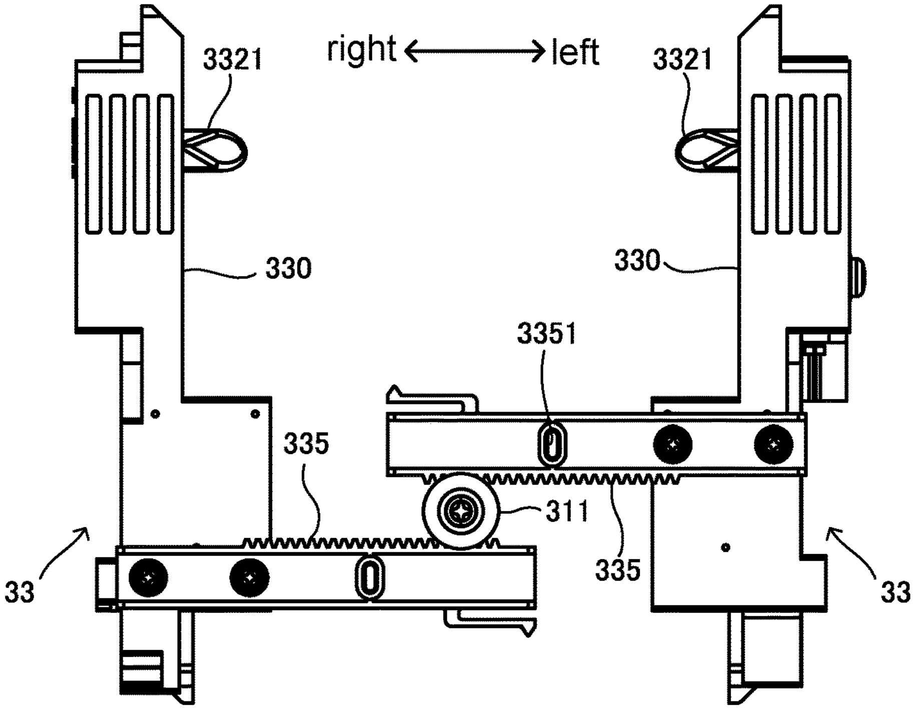
FIG. 14B is the same view as FIG. 14A except the potentiometer is removed.

FIG. 14A is a front view of the guide pinion, the guide rack, the potentiometer, and the widthwise side guides provided in the paper roll storing part. FIG. 14B is the same view as FIG. 14A except the potentiometer is removed. The front guide 31 shown in FIG. 13 is erased in FIG. 14A.

As shown in FIG. 14B, the guide rack 335 may be screwed to each of the side guide bodies 330. The guide rack 335 may move in the width direction along with the side guide body 330. The guide pinion 311 rotatably mounted on the front guide 31 (FIG. 13) may be arranged between the guide racks 335 secured to the side guide bodies 330. Each of the guide racks 335 may engage with the guide pinion 311, constituting a rack and pinion mechanism. Widthwise movement of one of the side guides 33 may thereby cause opposite movement of the other of the side guides 33. The guide rack 335 may have an ellipse meter receiving cylinder 3351 projecting forward. The cylinder 3351 may receive a not-shown shaft of the potentiometer 312 shown in FIG. 14A. The potentiometer 312 may be a variable resistor capable of converting the amount of movement to a voltage. The potentiometer 312 may vary the voltage according to the position of the shaft thereof corresponding to the position of the side guide 33. The voltage information from the potentiometer 312 may be transmitted to the controller of the printer 1. The controller may be thereby given the position of the side guide 33.

Figure 15:
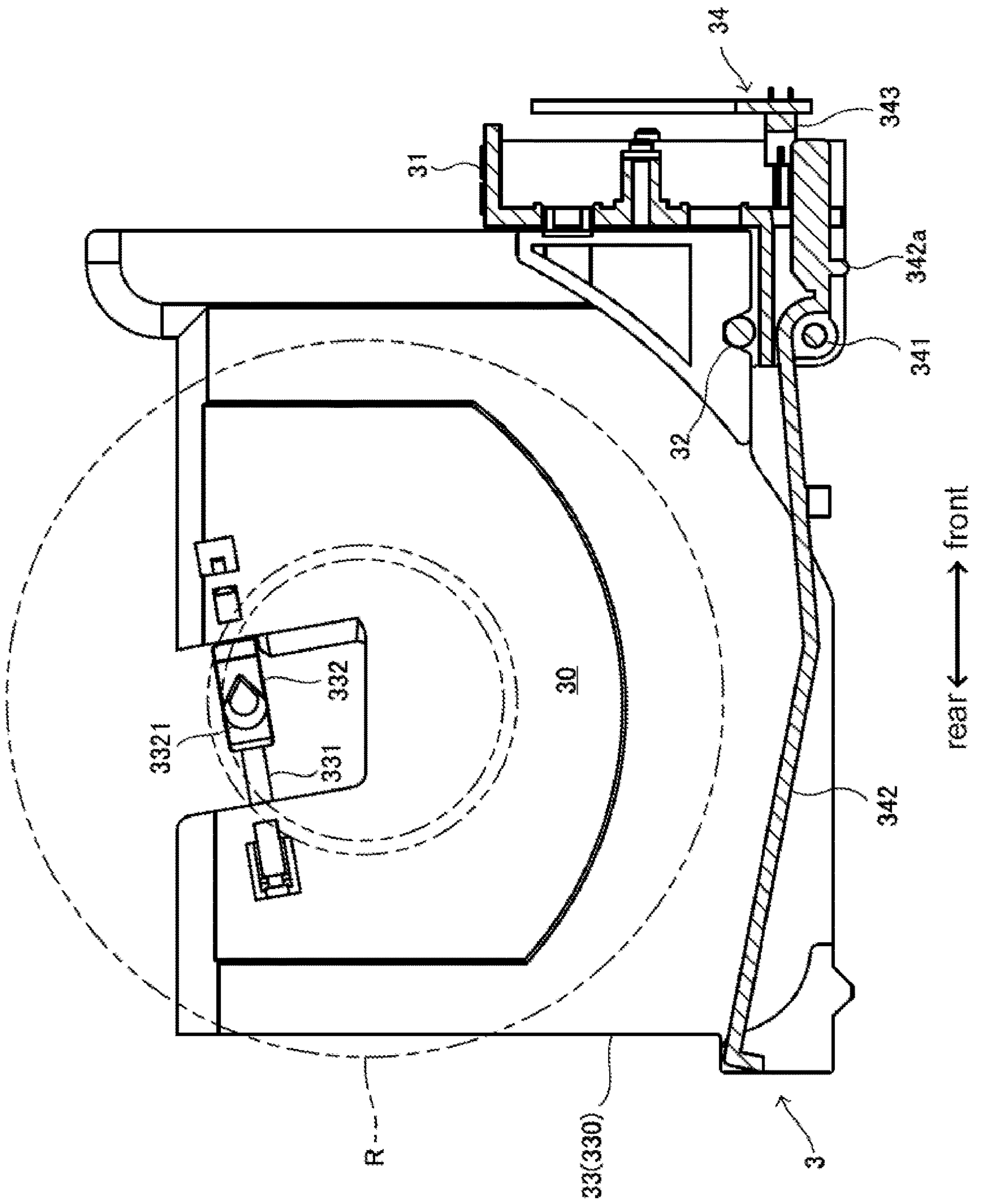
FIG. 15 is a side sectional view of the front guide, the side guide, and the drop detector of the widthwise center.

FIG. 15 is a side sectional view of the front guide, the widthwise side guide, and the drop detector of the widthwise center. The paper roll R held by the paper roll holder 332 is shown by two dot chain lines.

As shown in FIG. 15, the drop detector 34 may include a detector shaft 341, drop detection lever 342, and a drop detection sensor 343 near the bottom of the paper roll storing part 3. The detector shaft 341 may be secured to the front guide 31. The drop detection lever 342 may be rotatably mounted on the detector shaft 341. The drop detection lever 342 may be urged clockwise in FIG. 15 by a not-shown spring. On the front side of the drop detection lever 342, an abutting part 342*a* may protrude downward to abut against a not-shown bottom of the paper roll storing part 3, inhibiting clockwise rotation of the drop detection lever 342 beyond the position shown in FIG. 15. The drop detection lever 342 may stay in a posture (angle position) shown in FIG. 15 while there exists no paper roll in the storing space 30 or the paper roll holder 332 holds the paper roll R. The front end of the drop detection lever 342 may stay somewhat lower than a detection range of the drop detection sensor 343. The drop detection sensor 343 may be a photo-interrupter having a U-shaped detection range in planar view. The drop detection sensor 343 may detect that there exists nothing in the detection range in FIG. 15 since the front end of the drop detection lever 342 stays lower than the detection range.

Figure 16:
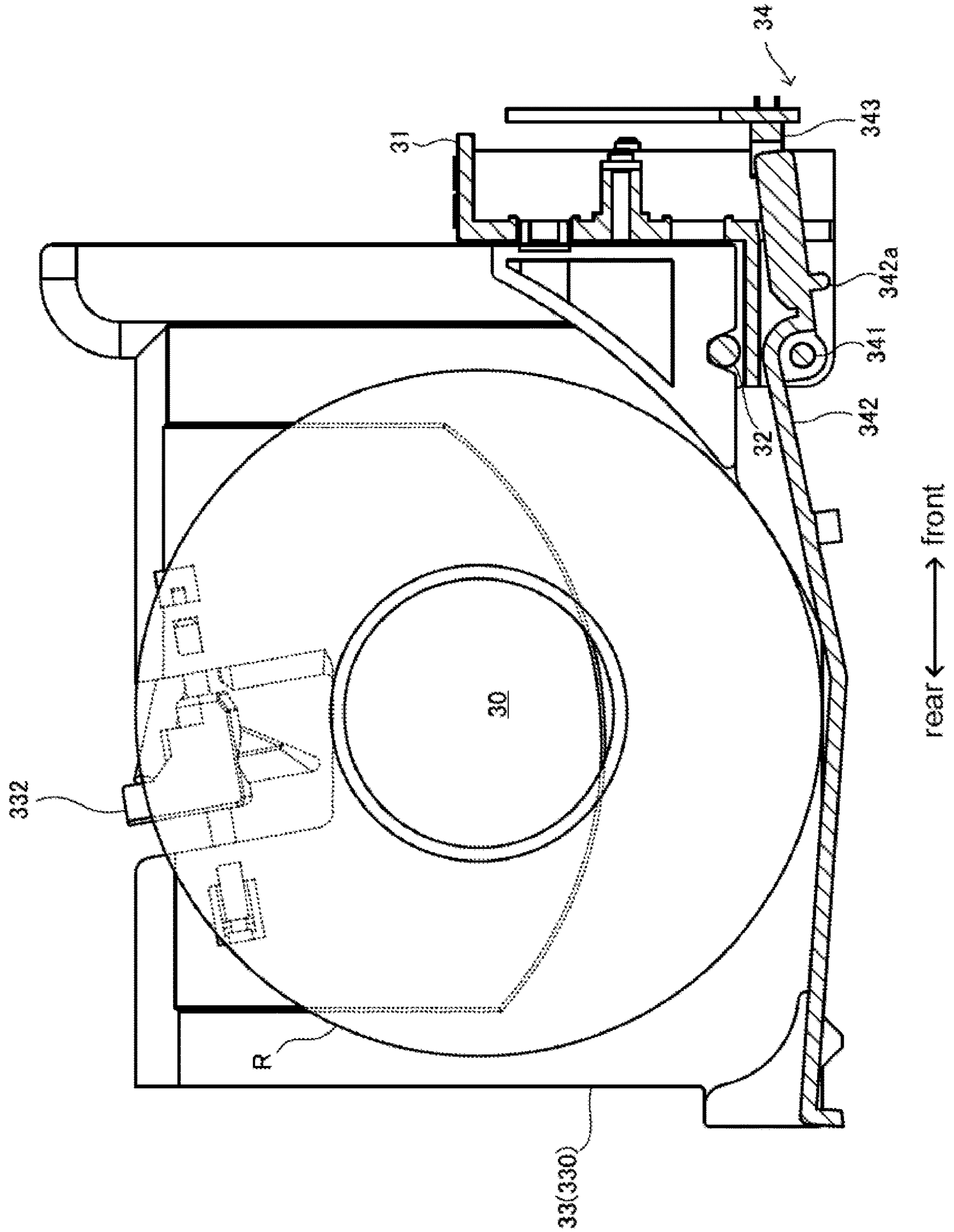
FIG. 16 is a side sectional view like FIG. 15 showing the state the paper roll has dropped.

FIG. 16 is a side sectional view like FIG. 15 showing the state the paper roll has dropped. The paper roll is shown by a solid line. Cross sections are not hatched in the drawings.

When the paper roll R drops out of the paper roll holder 332 by handling error or any mistake during installation, the weight of the paper roll may rotate the drop detection lever 342 counterclockwise in FIG. 16 against the not-shown spring. The front end of the drop detection lever 342 may come into the detection range of the drop detection sensor 343. The drop detection sensor 343 may detect that there exists something in the detection range. The detection may be transmitted to the controller of the printer 1. The controller may be thereby given that the paper roll has dropped.

The paper roll R may be a roll of liner-less label paper. Generally, the outer surface of the paper roll R is a printing surface while the inner surface thereof is an adhesive surface. As the paper R1 (FIG. 12) is drawn out of the paper roll R, it likely happens that part of adhesive on the inner surface sticks to the printing surface. It then likely happens that the paper roll R having a small amount of adhesive left on the printing surface drops on a layer of dust on the bottom of the paper roll storing part 3, thus causing a printing error on such part of the printing surface where dust adheres. Furthermore, as the paper R1 is drawn out of the paper roll R that has dropped, it likely happens that the paper roll R unexpectedly moves inside the storing space 30 to hit against the walls of the paper roll storing part 3, thus generating great variations on conveyance load. For the roll of liner-less label paper, greater conveyance force is required to draw paper out of the roll, thus causing rattling of the paper roll inside the space 30 and generating greater variations on conveyance load. For the roll of label paper, it likely happens that adhesive spreading to the sides of paper sticks to the side guide body 330, thus hindering rotation of the paper roll R and generating variations on conveyance load. For the roll of liner-less label paper, time-related deterioration causes change in the diameter of the paper roll, thus generating variations on conveyance load. Such variations on conveyance load hinders stable conveyance, thus generating printing errors and, in the worst case, suspending paper conveyance. It likely happens that increased load exceeding torque of the motor causes step-out of the motor such as a stepping motor.

In this embodiment, the controller of the printer 1 may be given information that the paper roll R has dropped. The controller can give an error message and/or stop the operation, thus preventing printing errors and/or conveyance errors of the paper R1 (FIG. 12).

Figure 17A:
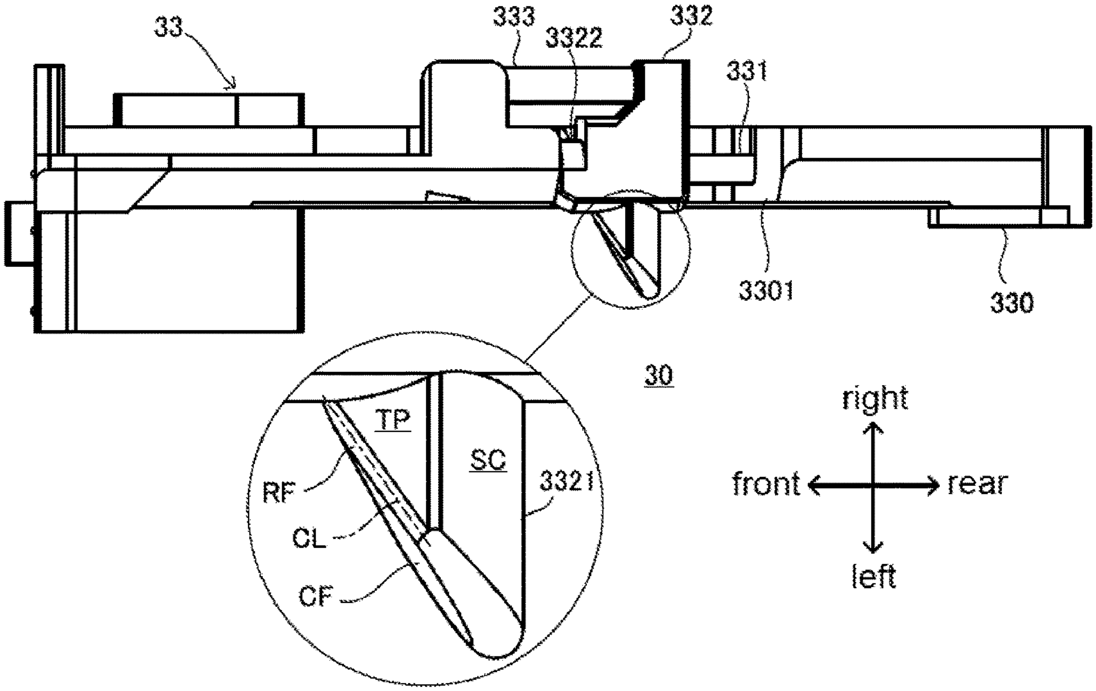
FIG. 17A is a plan view of the side guide on the right side.
Figure 17B:
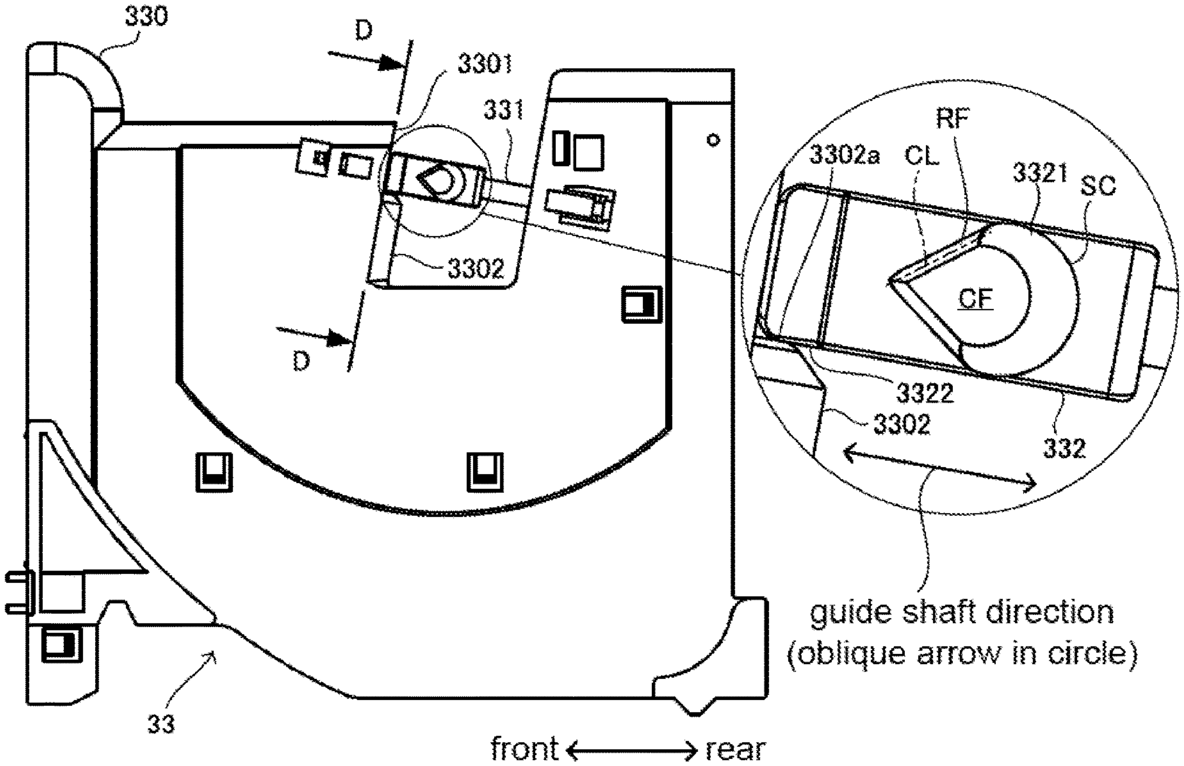
FIG. 17B is a left side view of the side guide shown in FIG. 17A.
Figure 18:
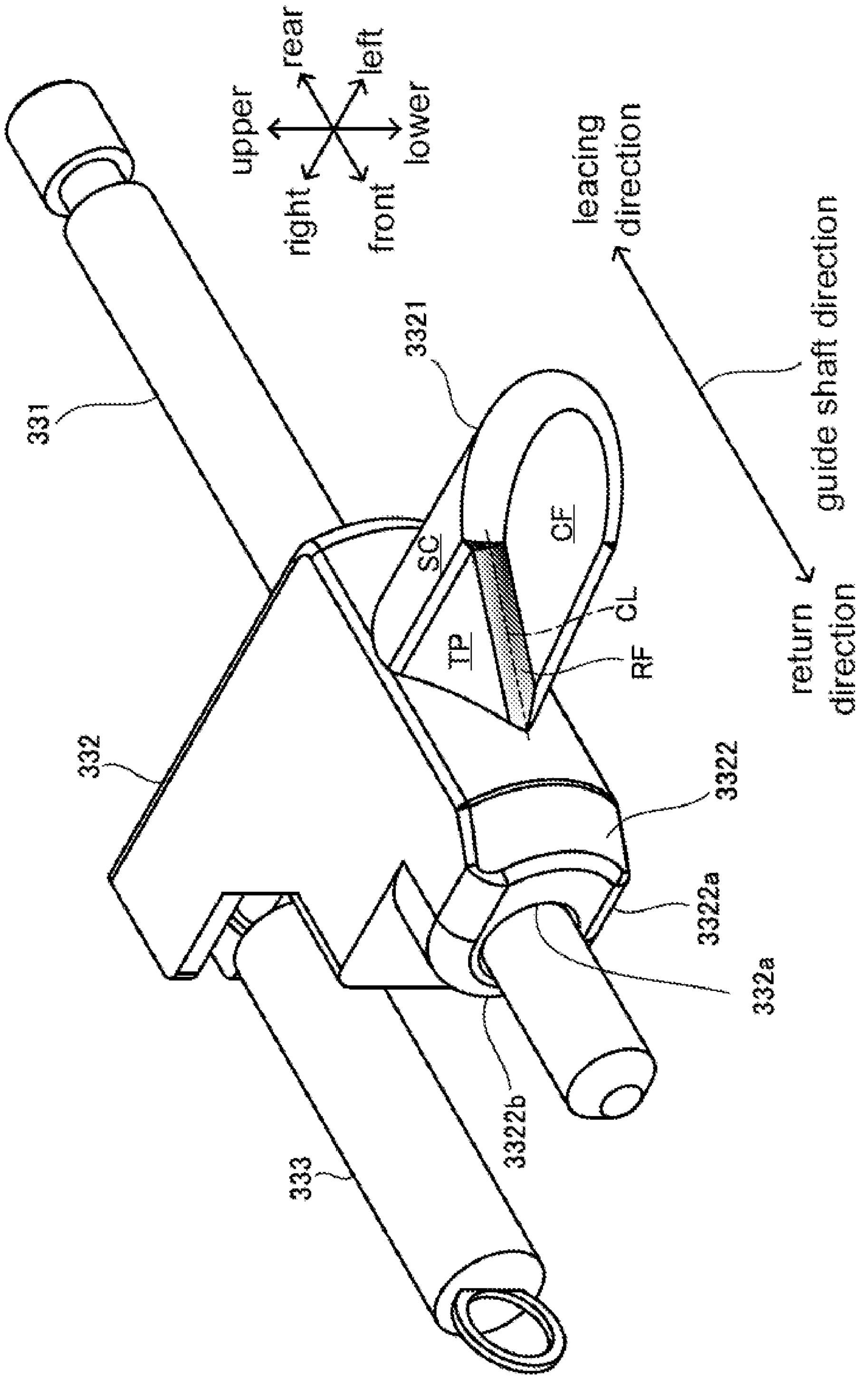
FIG. 18 is a perspective view of a holder guide shaft, a paper roll holder, and a holder torsion spring shown in FIG. 17A.

FIG. 17A is a plan view of the widthwise side guide on the right side. FIG. 17B is a left side view of the widthwise side guide shown in FIG. 17A. FIG. 18 is a perspective view of the holder guide shaft, the paper roll holder, and the holder torsion spring shown in FIG. 17A.

As shown in FIG. 17B, the side guide body 330 may include a cut-out 3301 caving downward. The cut-out 3301 may have a cut-out step 3302 protruding rearward on lower part of the front wall thereof. The cut-out step 3302 may have a flat surface to be engaged 3302*a* on the upper surface thereof. The flat surface to be engaged 3302*a* may be an example of the stopper.

The holder guide shaft 331 may span the cut-out 3301 between the front wall and the rear wall thereof. The holder guide shaft 331 may extend in the front and rear directions inclining downward toward the rear of the printer. The incline angle of the holder guide shaft 331 may be 10 degrees with respect to the horizontal direction. The extension direction of the holder guide shaft 331 may be referred to as a guide shaft direction. The holder guide shaft 331 may be mounted on the side guide body 330 with both ends of the holder guide shaft 331 with respect to the guide shaft direction being supported by the side guide body 330. As shown in FIG. 18, the paper roll holder 332 may have a holder through-hole 332*a* receiving the holder guide shaft 331. The paper roll holder 332 may be thereby mounted on the holder guide shaft 331. The paper roll holder 332 may be thereby rotatable on the holder guide shaft 331 and linearly movable in the guide shaft direction along the holder guide shaft 331. The holder guide shaft 331 may rotate to be switchable between a protruded state that the protrusion 3321 protrudes toward the storing space 30 and a retracted state that the protrusion 3321 retracts from the storing space 30. FIG. 17A, FIG. 17B, and FIG. 18 each shows the protruded state. The paper roll holder 332 in the protruded state may hold the paper roll R.

The holder tension spring 333 may couple the side guide body 330 and the paper roll holder 332. In the protruded state, the center of the holder tension spring 333 may be brought almost parallel to the holder guide shaft 331. The paper roll holder 332 may be urged forward to be at the frontmost position (the protruded state) while no external force is applied. This position may be referred to as a basic position. FIG. 17A, FIG. 17B, and FIG. 18 each shows the paper roll holder 332 staying at the basic position. The direction that the paper roll holder 332 approaches the basic position may be referred to as a return direction of the guide shaft direction. The direction that the paper roll holder 332 leaves the basic position may be referred to as leaving direction of the guide shaft direction. As shown in FIG. 18, the protrusion 3321 may have triangular part TP on the side of the return direction and semicircular part SC on the side of the leaving direction. The protrusion 3321 may have an oblique surface CF formed by the distal protruding end of the protrusion on the side of the leaving direction and the base end of the protrusion on the side of the return direction. A facing edge between the oblique surface CF and a surface of the triangular part TP may be R-chamfered. A facing edge between the oblique surface CF and a surface of the semicircular part SC may be R-chamfered. A facing edge between the surface of the triangular part TP and the surface of the semicircular part SC may be R-chamfered. As shown in rounded expanded views in FIG. 17A and FIG. 17B, the chamfered edge between the surface of the triangular part TP and the surface of the semicircular part SC of the paper roll holder 332 in the protruded state may curve around the center line CL as the curve center. The center line CL may extend upward and rearward from the base end to the distal protruding end of the protrusion. Especially, a curving surface on the upper front side may be a functioning surface when the paper roll R is being installed. The curving surface on the upper front side may be referred to as a functioning curving surface RF. FIG. 18 shows the functioning curving surface RF colored grey.

As shown in FIG. 18, the paper roll holder 332 may have a stopper engaging part 3322 at the end on the side of the return direction. The stopper engaging part 3322 may have a flat engaging surface 3322*a* on the lower part of the paper roll holder 332 in the protruded state. The stopper engaging part 3322 may further have an arc engaging surface 3322*b* on the right part of the paper roll holder 332 in the protruded state. The center line of the arc engaging surface 3322*b* may be the same as that of the holder through-hole 332*a*. The flat engaging surface 3322*a* may connect to the arc engaging surface 3322*b*.

Figure 19:
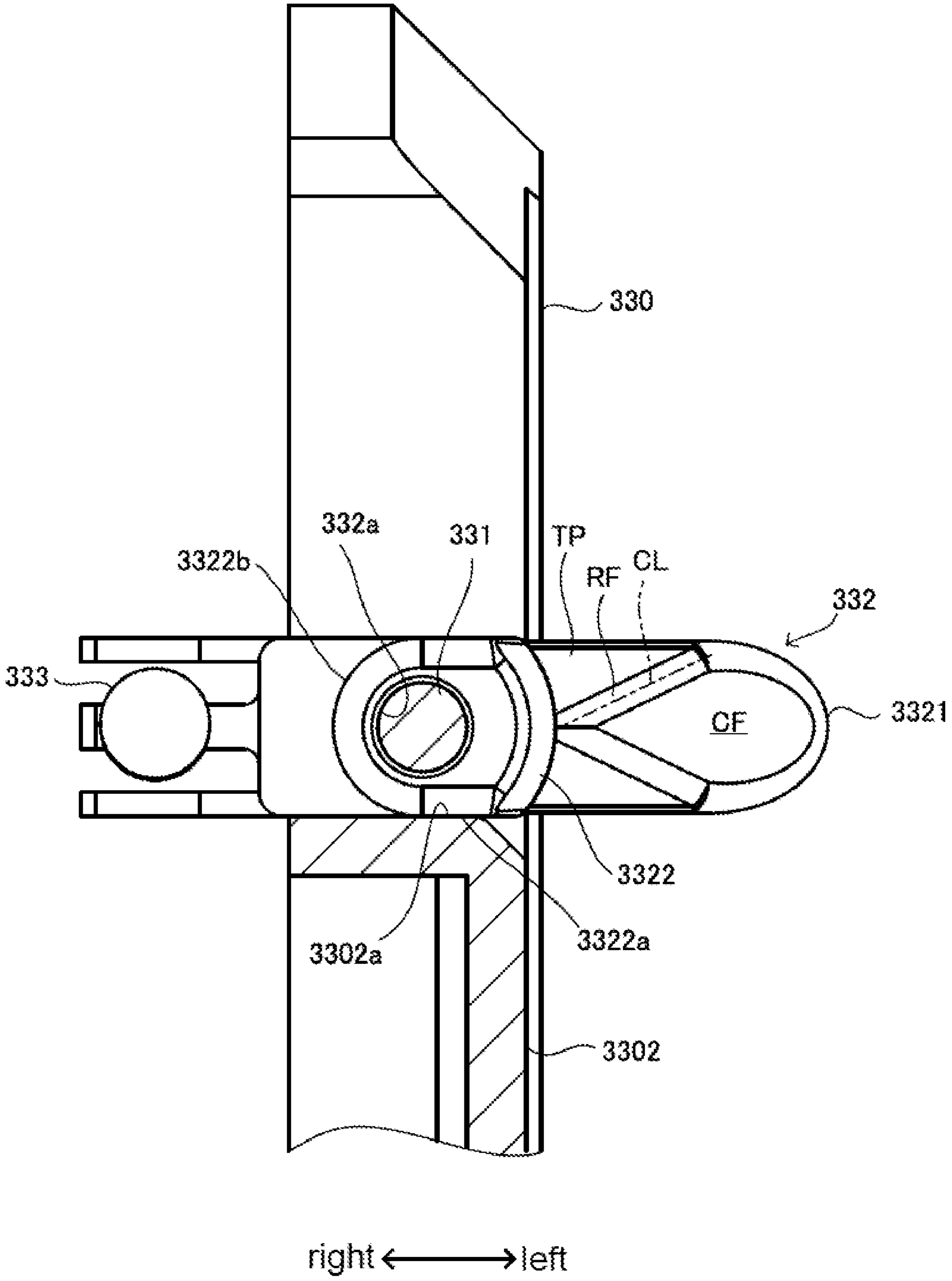
FIG. 19 is a sectional view of D-D line in FIG. 17B.

FIG. 19 is a sectional view of D-D line in FIG. 17B.

As shown in FIG. 19, the flat engaging surface 3322*a* of the paper roll holder 332 in the protruded state staying at the basic position may engage with the flat surface to be engaged 3302*a* of the side guide body 330. Their engagement may occur on the left side with respect to the center of the holder guide shaft 331 (widthwise inner side of the printer 1), thus inhibiting clockwise rotation of the paper roll holder 332 by the flat surface to be engaged 3302*a*. The paper roll holder 332 in the protruded state staying at the basic position cannot turn toward the direction turning the protrusion 3321 downward. The paper roll holder 332 in the protruded state staying at the basic position can rotate counterclockwise. Thus, the paper roll holder 332 in the protruded state staying at the basic position can turn toward the direction turning the protrusion 3321 upward. The paper roll holder 332 may rotate as the arc engaging surface 3322*b* slides on the flat surface to be engaged 3302*a*. The paper roll holder 332 may rotate as the arc engaging surface 3322*b* faces the flat surface to be engaged 3302*a* with a small interval therebetween.

The way the paper roll holder behaves is being described when removing the paper roll R from the storing space 30 (FIG. 13) and when installing the paper roll R into the storing space 30.

FIG. 20A1, FIG. 20A2, FIG. 20B1, and FIG. 20B2 show the way the paper roll holder behaves when removing the paper roll from the paper storing space.

FIG. 20A1 is a plan view of part of the widthwise side guide 33 on the right side while the paper roll holder 332 in the protruded state stays at the basic position. FIG. 20A1 shows the position and the posture of the paper roll holder 332 holding the paper roll R. FIG. 20B1 is a left side view of the side guide 33 shown in FIG. 20A1. As described above, while the paper roll holder 332 holds the paper roll R, the protrusion 3321 may fit in the hole formed on the paper core R0 (two dot chain lines in FIG. 20B1) to bring the inner circumferential surface of the paper core R0 into engagement with the surface of the semicircular part SC. As the paper R1 (FIG. 12) drawn from the paper roll R is conveyed, it may pull the paper roll R toward the oblique front upward (upper left in FIG. 20B1), causing a slight shift of the paper core R0 in the same direction. The inner circumferential surface of the paper core R0 may be still in engagement with the surface of the semicircular part SC of the protrusion 3321, which still allows smooth rotation of the paper roll R. In FIG. 20A1 and FIG. 20B1, engagement of the flat engaging surface 3322*a* with the flat surface to be engaged 3302*a* may inhibit rotation of the paper roll holder 332 turning the protrusion 3321 downward, thus preventing a drop of the paper roll R against sudden downward force.

FIG. 20A2 is a plan view of the protrusion 3321 retracted upward to permit removal of the paper roll R from the storing space 30. FIG. 20B2 is a left side view of the side guide 33 shown in FIG. 20A2. The operator may open the cover 22 obliquely front upward as shown in FIG. 2 for removal of the paper roll R. Lifting the paper roll R obliquely front upward may bring the lower inner circumferential surface of the paper core R0 into engagement with the lower end of the protrusion 3321. The paper core R0 may push the protrusion 3321 to turn the paper roll holder 332 to the direction turning the protrusion 3321 upward into the retracted state as shown in FIG. 20A2 and FIG. 20B2. The holder torsion spring 333 may stretch in the retracted state to urge the paper roll holder 332 to the protruded state. Nevertheless, the retracted state may be kept while the protrusion 3321 is kept in contact with the side surface of the paper roll R. Upon removal of the paper roll R from the storing space 30, the paper roll holder 332 may return to the protruded state as shown in FIG. 20A1 and FIG. 20B1.

FIG. 21A1, FIG. 21A2, FIG. 21A3, FIG. 21B1, FIG. 21B2, and FIG. 21B3 show the way the paper roll holder behaves when installing the paper roll into the paper storing space.

FIG. 21A1 is a plan view of part of the widthwise side guide 33 on the right side while the paper roll holder 332 in the protruded state stays at the basic position. FIG. 21A1 shows the position and the posture of the paper roll holder 332 before installation. FIG. 21B1 is a left side view of the widthwise side guide 33 shown in FIG. 21A1. In FIG. 21A1 and FIG. 21B1, the paper roll R (the outer periphery thereof) just in contact with the protrusion 3321 is shown by two dot chain lines. The interval between the side guides 33 on the right and left sides may be adjusted according to the width of the paper roll R before installation. The paper roll R may be set in the storing space 30 through the opening formed between the body case 21 and the opened cover 22. When inserting the paper roll R from obliquely front upside to the storing space 30, the edge of the paper roll R may be first brought into engagement with the functioning curving surface RF (FIG. 17A and FIG. 18) on the upper front side of the protrusion 3321 as shown in FIG. 21A1 and FIG. 21B1. The functioning curving surface RF may be a curving surface around the center line CL (FIG. 17A and FIG. 18) as the curve center. Such curving surface could reduce damage to the edge of the paper roll R at the beginning of installation. The paper roll R may apply obliquely rear downward force to the protrusion 3321. The paper roll holder 332 may then receive pushing force toward the leaving direction. The leaving direction may incline downward toward the rear side. That may increase the pushing force that the paper roll holder 332 receives greater toward the rear side. In FIG. 21B1, the direction of the force that the paper roll holder 332 receives is shown by a brank arrow. Even if the force from the paper roll R directs just below, the paper roll holder 332 may receive pushing force toward the leaving direction since the functioning curving surface RF is a curving surface around the center line CL as the curve center and the leaving direction inclines downward toward the rear side. The paper roll holder 332 may also receive downward turning force toward the direction turning the protrusion 3321 downward. The paper roll holder 332 is, however, not permitted to turn yet since the flat engaging surface 3322*a* engages with the flat surface to be engaged 3302*a* (FIG. 19).

FIG. 21A2 is a plan view of part of the widthwise side guide 33 on the right side while the paper roll R is pushed a little into the storing space 30. FIG. 21B2 is a left side view of the widthwise side guide 33 shown in FIG. 21A2. As the paper roll R pushes the protrusion 3321, the paper roll holder 332 may move toward the leaving direction (to the rear side) against the holder torsion spring, which may release engagement of the flat engaging surface 3322*a* with the flat surface to be engaged 3302*a* (FIG. 19), thus allowing the paper roll holder 332 to turn toward the direction turning the protrusion 3321 downward. The paper roll holder 332 may start turning upon disengagement of the flat engaging surface 3322*a* from the flat surface to be engaged 3302*a*. FIG. 21A2 and FIG. 21B2 each shows the state of the paper roll holder 332 before beginning turning.

FIG. 21A3 is a plan view of part of the widthwise side guide 33 on the right side while the paper roll R is further pushed into the storing space 30. FIG. 21B3 is a left side view of the widthwise side guide 33 shown in FIG. 21A3. Upon disengagement of the flat engaging surface 3322*a* from the flat surface to be engaged 3302*a*, the paper roll holder 332 may start turning toward the direction turning the protrusion 3321 downward. The paper roll holder 332 may be then brought into the retracted state that the protrusion 3321 is retracted from the storing space 30. As the paper roll R is further pushed until the hole of the paper core R0 (FIG. 20B1) faces the protrusion 3321, the paper roll holder 332 may turn to the protruded state by the holder torsion spring 333 and moves toward the return direction. The paper roll holder 332 may be brought into the state as shown in FIG. 20A1 and FIG. 20B1.

According to the printer 1 of this embodiment, when the paper roll R held by the paper roll holder 332 receives unintended downward force, engagement of the flat engaging surface 3322*a* and the flat surface to be engaged 3302*a* can prevent the protrusion 3321 from turning downward, thus surely preventing a drop of the paper roll R out of the protrusion 3321. When the paper roll R receives unintended upward force, the paper roll R would not largely displace upward by its own weight. The paper roll holder 332 would not turn to the direction turning the protrusion 3321 upward unless man-made upward force is applied. Pushing the paper roll R into the storing space 30 can move the paper roll holder 332 toward the leaving direction and thereby disengage the flat engaging surface 3322*a* from the flat surface to be engaged 3302*a*. The embodiment facilitates a process for the paper roll R to be installed and then held by the paper roll holder 332.

The units constituting the printer 1 are being explained for the structure and the removal procedure.

Figure 22B:
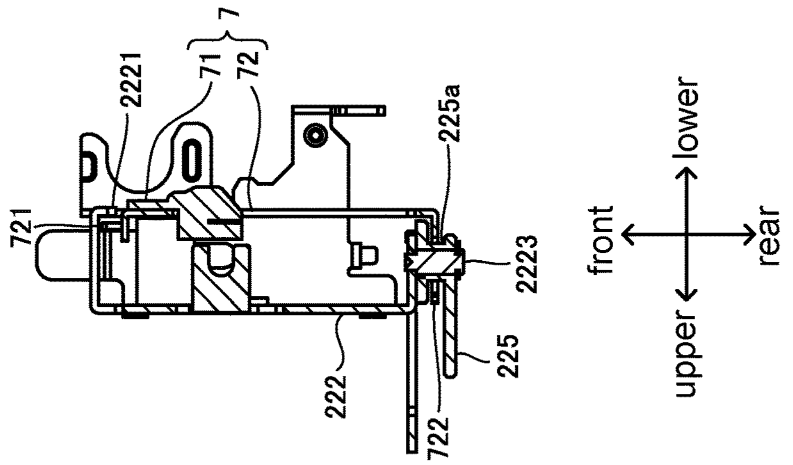
FIG. 22B is a sectional view of E-E line in FIG. 22A.
Figure 22A:
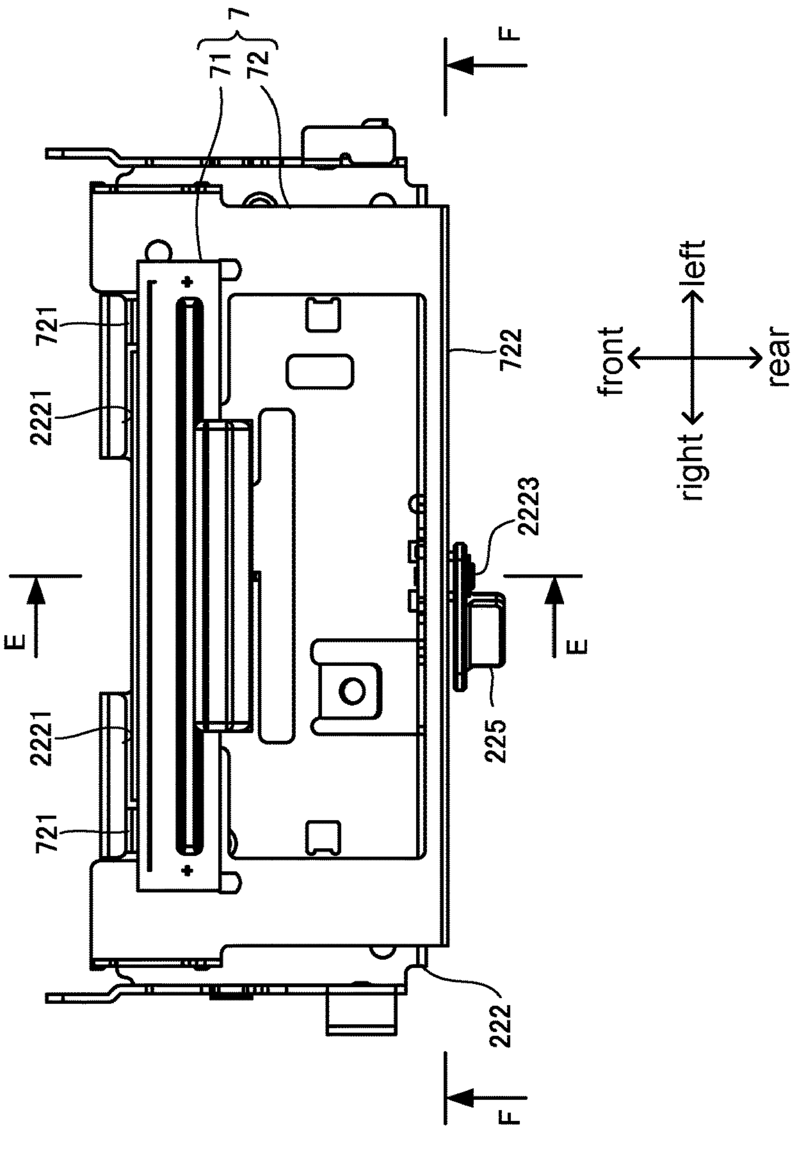
FIG. 22A is a bottom view of the head unit and an upper frame.

FIG. 22A is a bottom view of the thermal head unit and the upper frame. FIG. 22B is a sectional view of E-E line in FIG. 22A. The directions in the description and the drawings refer to the directions in the printer whose cover is closed.

As described above, the head unit 7 may include the print head 71 and the head frame 72. The print head 71 may be secured to the head frame 72. The head unit 71 may be removably attached to the second upper frame 222. A not-shown compressed spring may be provided between the head unit 7 and the second upper frame 222. The compressed spring may urge the front part of the head unit 7 (where the print head 71 may be mounted) downward. In the cover closed state, the print head 71 may abut against the platen roller 51 (FIG. 2) and thereby slightly shift upward against force of the compressed spring. FIG. 22B shows the head unit 7 slightly shifted upward in the cover closed state. In the cover open state, the front end of the head unit 7 may slightly turn downward around the rear end compared to the position shown in FIG. 22B. The head frame 72 may have two head claws 721 on the distal end. The two head claws 721 may engage with claw receivers 2221 formed in the second upper frame 222, thus preventing more rotation of the head unit 7.

The rear end of the second upper frame 222 may be folded downward. A head mounting pin 2223 may be secured to the folded part of the second upper frame 222. The head mounting pin 2223 may rotatably include a head mounting lever 225 made of resin. The head mounting lever 225 may include a lever cylinder 2251. The lever cylinder 2251 may have an internal hole of slightly greater diameter than the outer periphery of the head mounting pin 2223. The head mounting pin 2223 may enter the hole of the lever cylinder 2251. The rear end of the head frame 72 may have a head folded part 722 bent upward. The head folded part 722 may have a head cut-out 722*a* (FIG. 23B1) engaged with the outer periphery of the lever cylinder 2251 while the head unit 7 is mounted.

FIG. 23A1, FIG. 23A2, FIG. 23B1, and FIG. 23B2 show the removal of the head unit shown in FIG. 22A by operating the head mounting lever. The directions shown in the description and the drawings are the directions in the printer whose cover is closed.

FIG. 23 A1 is a rear view of the head unit 7 and the second upper frame 222 shown in FIG. 22A. FIG. 23B1 is a sectional view of F-F line in FIG. 22A. While the head unit 7 is held by the second upper frame 222 as shown in FIG. 23A1, the head mounting lever 225 may be on the right side. As shown in FIG. 23B1, the lever cylinder 2251 may have a body having an outer peripheral surface of an oval cross section including plane surfaces 2251*a* parallel to each other. The head cut-out 722*a* may have an upper arc recess and a lower liner recess. The inner diameter of the upper arc recess of the head cut-out 722*a* may be slightly greater than the inner diameter of the arc surface formed on the outer periphery of the lever cylinder 2251. The lower liner recess of the head cut-out 722*a* may have an interval slightly greater than the interval of the parallel plane surfaces 2251*a* formed on the outer periphery of the lever cylinder 2251. While the lead mounting lever 225 is on the right side, the arc surface formed on the outer periphery of the lever cylinder 2251 may be positioned at both ends on the right and left sides. The arc surfaces on the right and left sides respectively may engage with the arc recess of the head cut-out 722*a*, thus restricting movement of the rear end of the head frame 72 downward and keeping the head frame 72 on the second upper frame 222.

FIG. 23A2 shows the state that the head mounting lever 225 has turned counterclockwise from the state in FIG. 23A1. FIG. 23B2 is a sectional view of F-F line in FIG. 22A corresponding to the FIG. 23A2 state. As shown in FIG. 23A2, the head mounting lever 225 may be on the left side after turned counterclockwise at a 90-degree angle. As shown in FIG. 23B2, the flat surfaces 2251*a* formed on the outer periphery of the lever cylinder 2251 may be at the ends on the right and left sides, thus allowing the lever cylinder 2251 to move downward through the linear recess of the head cut-out 722*a*. The rear end of the head frame 72 may be thereby movable downward from the second upper frame 222.

The removable procedure of the head unit 7 may include opening the cover 22, turning the lead mounting lever 225 at a 90-degree angle (from the FIG. 23A1 state to the FIG. 23A2 state), shifting the rear end of the head unit 7 downward to disengage from the second upper frame 222, disengaging the head claw 721 from the claw receiver 2221, and removing a connector of a not-shown cable for the print head 71 and the controller. The installation procedure may include the reverse steps. The embodiment may facilitate removal and installation of the head unit 7, thus improving maintenance and parts replacement performance.

Figure 24B:
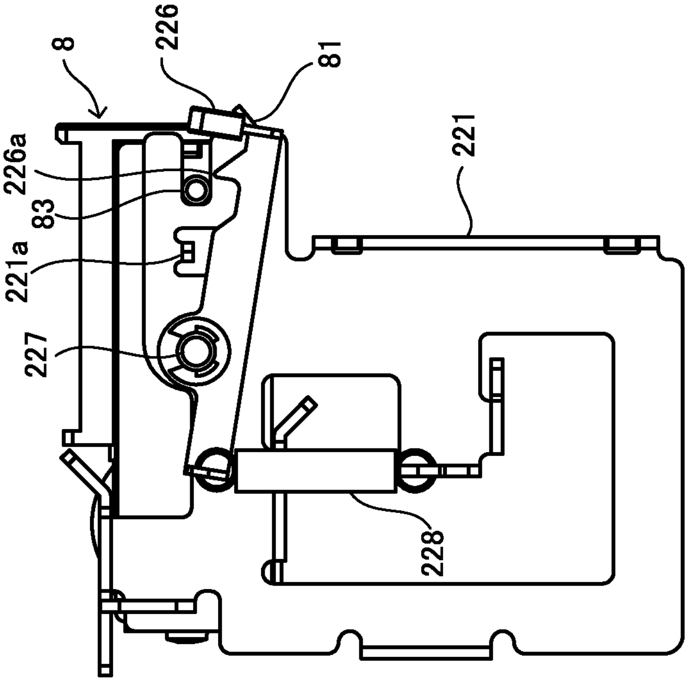
FIG. 24B is another side view of the movable blade unit and the upper frame.
Figure 24A:
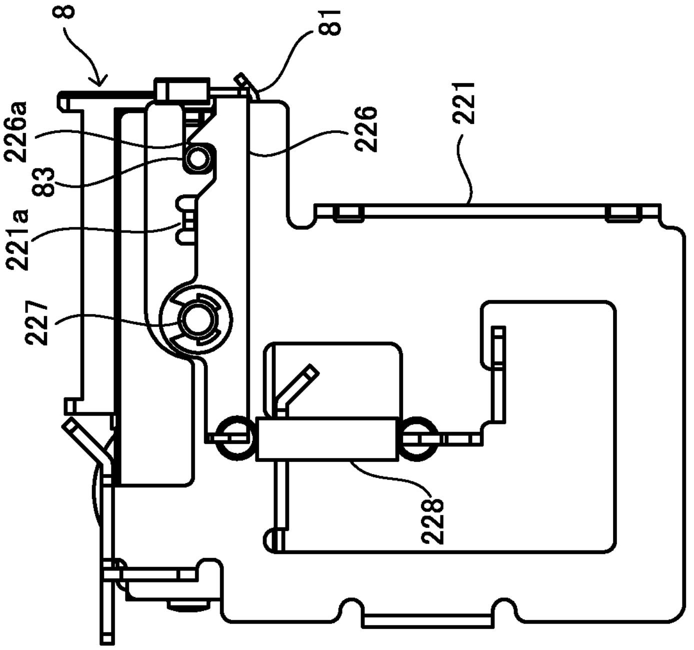
FIG. 24A is a side view of a movable blade unit and the upper frame.

FIG. 24A and FIG. 24B each is a side view of the movable blade unit and the upper frame.

As described above, the movable blade unit 8 may slide toward the removal direction (rightward in FIG. 24A, 24B) by operating the two lock levers 226 mounted on the first upper frame 221. FIG. 24A shows the state that the lock levers 226 engage with the lock pins 83 to restrict movement of the movable blade unit 8. FIG. 24B shows the state that the movable blade unit 8 is permitted to slide by the operation of the lock levers 226. As shown in FIG. 24A, the first upper frame 221 may be provided with the lock levers 226, lock lever shafts 227, and lock springs 228, all of which may be symmetrically mounted on the right and left ends of the first upper frame 221. The elements only on the right side is being described. The lock lever shaft 227 may be securely based on the first upper frame 221 to protrude widthwise outward. The lock lever 226 may be rotatably mounted to the lock lever shaft 227. The lock spring 228 may be connected to the lock lever 226 at one end and to the first upper frame at the other end. The lock lever 226 may be urged by the lock spring 228 to rotate counterclockwise in FIG. 24A and FIG. 24B. The first upper frame 221 may be provided with a rotation stopper 221*a* protruding widthwise outward, thus restricting counterclockwise rotation of the lock lever 226 from the posture shown in FIG. 24A. The movable blade unit 8 shown in FIG. 24A may be prohibited to slide toward the removal direction by engagement of the lock pin 83 with a latch 226*a* formed in the lock lever 226.

As shown in FIG. 24B, operating the lock lever 226 against the lock spring 228 for clockwise rotation in FIG. 24B may disengage the lock pin 83 from the latch 226*a*, thus permitting the movable blade unit 8 to slide. The first upper frame 221 may be provided with a spring urging the movable blade unit 8 toward the removal direction. Operating the lock lever 226 may permit the movable blade unit 8 to slide a little to the removal direction by force of the spring.

Figure 25B:
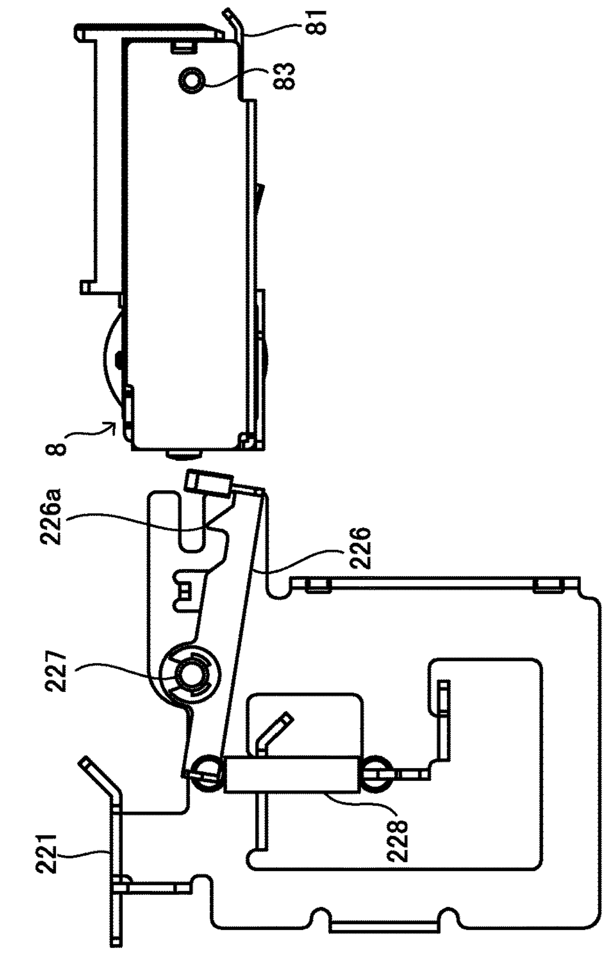
FIG. 25B shows the removal of the movable blade unit from the upper frame.
Figure 25A:
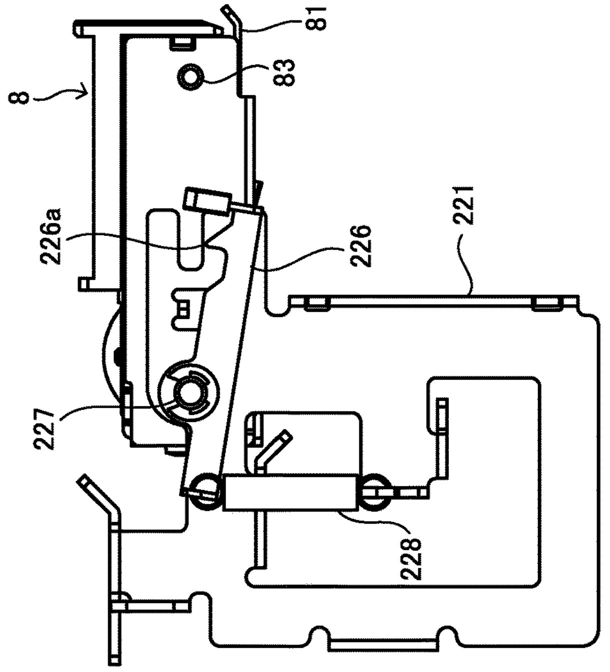
FIG. 25A shows the removal of the movable blade unit from the upper frame.

FIG. 25A and FIG. 25B show the removal of the movable blade unit from the upper frame.

FIG. 25A shows the state that the movable blade unit 8 has slid a little. FIG. 25B shows the state the movable blade unit 8 has been removed from the first upper frame 221. The removable procedure may include sliding the movable blade unit 8 a little, disconnecting a connector of a not-shown cable for the movable blade unit 8 and the controller of the printer 1, and then fully sliding the movable blade unit 8 toward the removal direction. The installation procedure may include the reverse steps. The embodiment may facilitate removal and installation of the movable blade unit 8 with respect to the cover 22, thus improving maintenance and parts replacement performance.

Figure 26A:
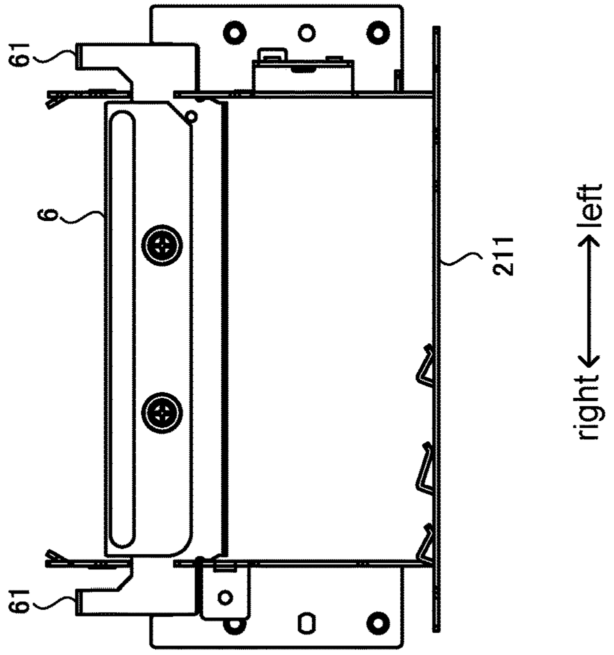
FIG. 26A is a front view of the fixed blade and a lower frame.
Figure 26B:
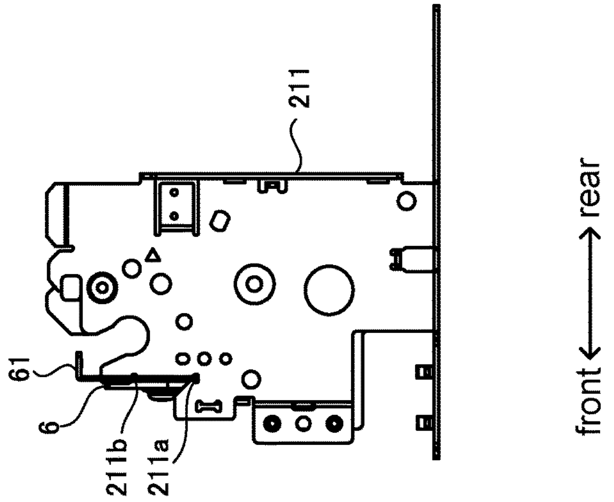
FIG. 26B is a side view of the fixed blade and the lower frame shown in FIG. 26A.
Figure 26C:
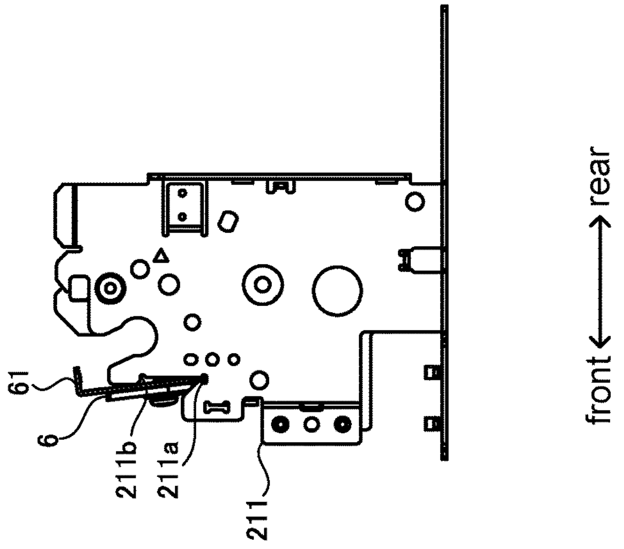
FIG. 26C is a side view like FIG. 26B showing the removal of the fixed blade from the lower frame.

FIG. 26A is a front view of the fixed blade and the lower frame. FIG. 26B is a side view of the fixed blade and the lower frame shown in FIG. 26A. FIG. 26C is a side view like FIG. 26B showing the removal of the fixed blade from the lower frame.

As shown in FIG. 26A and FIG. 26B, the fixed blade 6 may be mounted on the upper front of the lower frame 211. The lower frame may have side plates on the right and left sides whose lower ends connect each other to form a U shape as seen from front. The side plates may be formed almost plane-symmetrically with respect to a plane perpendicular to the width direction. One of the side plates is being described and any description common to both can be omitted for the other of the side plates. The lower end of the fixed blade 6 may fit into first cut-outs 211*a* formed on the side plates of the lower frame 211. The fixed blade 6 may be inhibited to move upward by a fixed blade receiver 211*b* formed in the side plate of the lower frame 211. The fixed blade receiver 211*b* may have an L-shape rotated almost at 180-degree angle. The upper part of the fixed blade 6 may be urged rearward by a not-shown spring. The fixed blade 6 may have movable blade handles 61 on the upper widthwise ends. The movable blade 6 may be removed and installed by use of the movable blade handles 61.

Pulling the handles 61 forward against the spring may disengage the upper end of the fixed blade 6 from the fixed blade receiver 211*b* to permit the removal of the fixed blade 6 obliquely front upward. The installation procedure may include first putting the lower end of the fixed blade 6 into the cut-out 221*a* and then fitting the upper end thereof into the fixed bade receiver 211*b*. The embodiment may facilitate removal and installation of the fixed blade 6 with respect to the body case 21, thus improving maintenance and parts replacement performance.

Figure 27A:
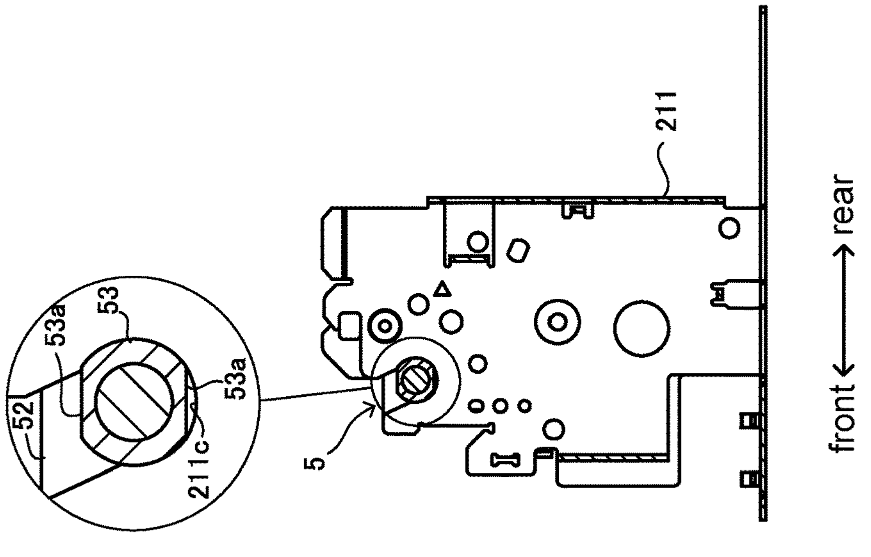
FIG. 27A is a sectional view of the platen unit and the lower frame showing the removal of the platen unit from the lower frame.
Figure 27B:
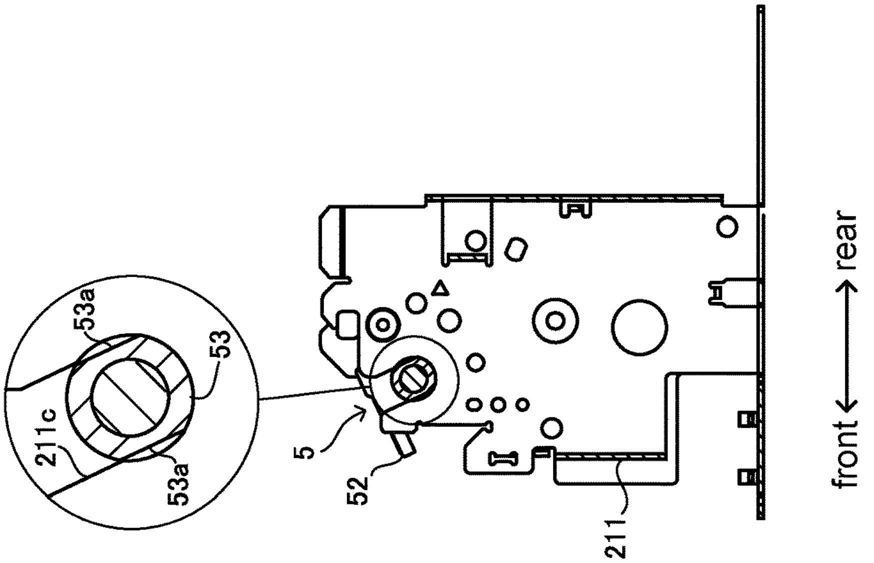
FIG. 27B is another sectional view of the platen unit and the lower frame showing the removal of the platen unit from the lower frame.
Figure 27C:
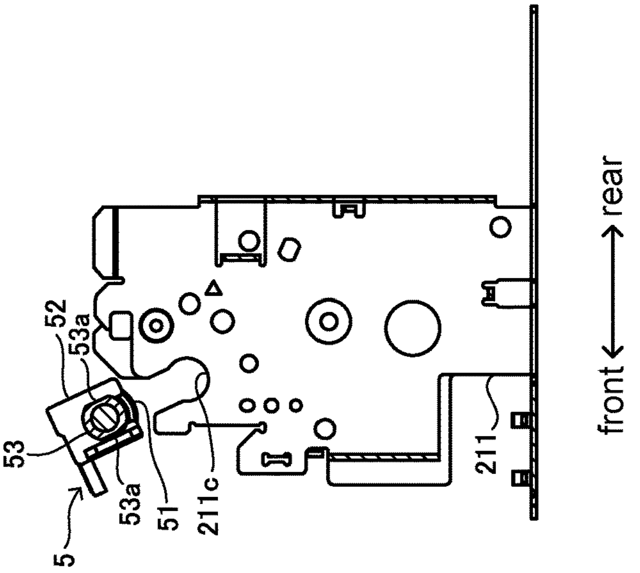
FIG. 27C is another sectional view of the platen unit and the lower frame showing the removal of the platen unit from the lower frame.

FIG. 27A, FIG. 27B, and FIG. 27C each is a sectional view of the platen unit 5 and the lower frame 211 as seen toward widthwise inside on the widthwise outside (left side) of the side plate on the left side of the lower frame 211. The drawings show the removal of the platen unit from the lower frame.

As described above, the platen unit 5 may include the platen roller 51 (FIG. 2), the platen frame 52, and the two bearings 53. The bearing 53 may have a cylindrical body having an outer peripheral surface of an oval cross section including plane surfaces 53*a* parallel to each other. As shown in FIG. 27C. the side plate of the lower frame 211 may have a second cut-out 211*c*. The second cut-out 211*c* may have a lower arc recess and an upper liner recess. The inner diameter of the lower arc recess of the second cut-out 211*c* may be slightly greater than the inner diameter of the arc surface formed on the outer periphery of the bearing 53. The liner recess of the second cut-out 211*c* may have an interval slightly greater than the interval of the parallel plane surfaces 53*a* formed on the outer periphery of the bearing 53. While the platen unit 5 is mounted on the lower frame 211 as shown in FIG. 27A, the arc surfaces formed on the outer periphery of the bearing 53 may be positioned at both ends on the right and left sides. The arc surfaces on the right and left sides respectively may engage with the arc recess of the second cut-out 211*c*, thus restricting movement of the platen unit 5 and unremovably keeping the platen unit 5 on the lower frame 211. As shown in FIG. 26B, the fixed blade 6 mounted on the lower frame 211 may inhibit rotation of the platen frame 52 shown in FIG. 27A.

The removal procedure of the platen unit 5 from the lower frame 211 may include opening the cover 22 and removing the fixed blade 6 as described above. The procedure may further include rotating the platen frame 52 counterclockwise in FIG. 27B. The platen frame 52 may abut against a rotation stopper in a position shown in FIG. 27B. In the FIG. 27B state, the plane surface 53*a* may be brought parallel to the linear part of the second cut-out 211*c* to permit the platen unit 5 shifting obliquely front upward. FIG. 27C shows the state that the platen unit 5 has been removed from the lower frame 211. The installation procedure may include the reverse steps. The embodiment may facilitate removal and installation of the platen unit 5 with respect to the body case 21, thus improving maintenance and parts replacement performance.

The invention may be embodied in various ways within the scope of the invention besides the embodiments described above. The printer 1 may include an impact dot printer and any other printer regardless of a printing method. The paper roll holders 332 mounted on the pair of widthwise side guides 33 may function in the same manner as described above. Otherwise, one of the paper roll holders 332 may be fixed to the one of the side guides 33. The holder guide shaft 331 may horizontally extend or slantly extend upward toward the rear to accept the paper roll R installed from front at an almost horizontal angle. The paper roll R without the paper core R0 and having paper R only rounded around the center hole may be used.

The element only described in the embodiment may be applied to the modified embodiment.

What is claimed is:

1. A printer provided with a storing space for a paper roll having a core hole in the center comprising:

a paper roll holder having a protrusion adapted to fit into the core hole of the paper roll, the paper roll holder being switchable between a protruded state that the protrusion protrudes into the storing space and a retracted state that the protrusion retracts from the storing space, and the paper roll holder being adapted to hold the paper roll while the paper roll holder is in the protruded state; and a pair of widthwise side guides formed on the left and right sides of the storing space; and a holder guide shaft mounted on each of the widthwise side guide; and a stopper adapted to engage with the paper roll holder while the paper roll holder is in the protruded state to prevent the protrusion from turning to a predetermined direction, wherein the paper roll holder is mounted on the holder guide shaft;

the paper roll holder moves when the paper roll holder is pushed by the paper roll that is being set into the storing space, and movement of the paper roll holder releases the engagement with the stopper to allow the protrusion to turn to the predetermined direction, and the paper roll holder is movable along the holder guide shaft in the front and rear directions of the printer, the paper roll holder is positioned lower as the paper roll holder moves rearward, and the paper roll holder moves rearward when the paper roll holder is pushed by the paper roll that is being set into the storing space.

2. The printer of claim 1 further comprising a resilient member that urges the paper roll holder to a position engageable with the stopper and that brings the paper roll holder into the protruded state.

3. The printer of claim 1, wherein the protrusion has an upper front surface that is curved around a center line as a curve center, the center line extending rearward and upward toward a protruding end of the protrusion.

4. The printer of claim 2, wherein the protrusion has an upper front surface that is curved around a center line as a curve center, the center line extending rearward and upward toward a protruding end of the protrusion.

* * * * *